United States Patent
Chen et al.

(10) Patent No.: US 11,847,571 B2
(45) Date of Patent: *Dec. 19, 2023

(54) SYSTEMS AND METHODS FOR CONTRASTIVE LEARNING OF VISUAL REPRESENTATIONS

(71) Applicant: Google LLC, Mountain View, CA (US)

(72) Inventors: Ting Chen, Toronto (CA); Geoffrey Everest Hinton, Toronto (CA); Simon Kornblith, Toronto (CA); Mohammad Norouzi, Toronto (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,070

(22) Filed: Jul. 12, 2022

(65) Prior Publication Data
US 2022/0374658 A1 Nov. 24, 2022

Related U.S. Application Data

(63) Continuation of application No. 17/018,372, filed on Sep. 11, 2020, now Pat. No. 11,386,302, which is a
(Continued)

(51) Int. Cl.
*G06V 10/00* (2022.01)
*G06N 3/084* (2023.01)
(Continued)

(52) U.S. Cl.
CPC ......... *G06N 3/084* (2013.01); *G06F 18/2155* (2023.01); *G06F 18/2178* (2023.01);
(Continued)

(58) Field of Classification Search
CPC .. G06T 5/002; G06T 5/20; G06T 7/90; G06T 3/40; G06T 3/60; G06T 11/001;
(Continued)

(56) References Cited

U.S. PATENT DOCUMENTS 10,628,679 B1 * 4/2020 Queen ................. G06V 40/103
10,902,616 B2 1/2021 Brown et al.
(Continued)

OTHER PUBLICATIONS

Abadi et al, "Tensorflow: A System for Large-Scale Machine Learning", Symposium on Operating Systems Design and Implementation, Nov. 2-4, 2-16, Savannah, Georgia, 20 pages.
(Continued)

*Primary Examiner* — Sean T Motsinger
(74) *Attorney, Agent, or Firm* — Dority & Manning, P.A.

(57) ABSTRACT

Systems, methods, and computer program products for performing semi-supervised contrastive learning of visual representations are provided. For example, the present disclosure provides systems and methods that leverage particular data augmentation schemes and a learnable nonlinear transformation between the representation and the contrastive loss to provide improved visual representations. Further, the present disclosure also provides improvements for semi-supervised contrastive learning. For example, computer-implemented method may include performing semi-supervised contrastive learning based on a set of one or more unlabeled training data, generating an image classification model based on a portion of a plurality of layers in a projection head neural network used in performing the contrastive learning, performing fine-tuning of the image classification model based on a set of one or more labeled training data, and after performing the fine-tuning, distilling the image classification model to a student model comprising a relatively smaller number of parameters than the image classification model.

20 Claims, 17 Drawing Sheets
(7 of 17 Drawing Sheet(s) Filed in Color)

Related U.S. Application Data continuation-in-part of application No. 16/847,163, filed on Apr. 13, 2020, now Pat. No. 11,354,778.

(51) Int. Cl.
    G06N 3/08      (2023.01)
    G06F 18/21     (2023.01)
    G06F 18/241    (2023.01)
    G06F 18/214    (2023.01)
    G06V 10/764    (2022.01)
    G06V 10/774    (2022.01)
    G06V 10/778    (2022.01)

(52) U.S. Cl.
    CPC ............ *G06F 18/241* (2023.01); *G06N 3/08* (2013.01); *G06V 10/764* (2022.01); *G06V 10/7753* (2022.01); *G06V 10/7788* (2022.01); *G06T 2207/20081* (2013.01)

(58) Field of Classification Search
    CPC . G06T 2207/10024; G06T 2207/20081; G06T 2207/20084; G06T 2210/22; G06V 10/774; G06V 10/7747; G06N 3/08–088
    See application file for complete search history.

(56) References Cited

U.S. PATENT DOCUMENTS

| | | | | |
|---|---|---|---|---|
| 11,354,778 B2* | 6/2022 | Chen | | G06V 10/764 |
| 11,381,888 B2 | 7/2022 | Krishnamurthy | | |
| 11,386,302 B2* | 7/2022 | Chen | | G06N 3/0454 |
| 2016/0328644 A1* | 11/2016 | Lin | | G06N 3/084 |
| 2019/0228658 A1 | 7/2019 | Huang et al. | | |
| 2020/0134016 A1 | 4/2020 | Cao et al. | | |
| 2020/0184278 A1* | 6/2020 | Zadeh | | G06K 9/6264 |
| 2021/0049346 A1* | 2/2021 | Skala | | A61B 5/0071 |
| 2021/0089890 A1* | 3/2021 | Tang | | G06V 20/56 |
| 2021/0124881 A1* | 4/2021 | Li | | G06F 40/30 |
| 2021/0184278 A1 | 6/2021 | Kataoka et al. | | |
| 2021/0319266 A1* | 10/2021 | Chen | | G06V 10/764 |
| 2021/0327029 A1* | 10/2021 | Chen | | G06T 11/60 |

OTHER PUBLICATIONS

Arora et al, "A Theoretical Analysis of Contrastive Unsupervised Representation Learning", arXiv: 1902v1, Feb. 25, 2019, 19 pages.
Bachman et al, "Learning Representations by Maximizing Mutual Information Across Views", arXiv: 1906v 2, Jul. 8, 2019, 11 pages.
Becker et al, "Self-organizing Neural Network that Discovers Surfaces in Random-Dot Stereograms", Nature, vol. 355, Jan. 9, 1992, 3 pages.
Bengio et al, "Greedy Layer-Wise Training of Deep Networks", Advances in Neural Information Processing Systems, 8 pages.
Berg et al, "Birdsnap: Large-Scale Fine-Grained Visual Categorization of Birds", Conference on Computer Vision and Pattern Recognition, 8 pages.
Berthelot et al, "Mixmatch: A Holistic Approach to Semi-Supervised Learning", arXiv:1905v2, Oct. 23, 2019, 14 pages.
Bossard et al, "Food-101-Mining Discriminative Components with Random Forests", European Conference on Computer Vision, 16 pages.
Chapelle et al, "Semi-Supervised Learning", MIT Press, 2006, 524 pages.
Chen et al., "Big Self Supervised Models are Strong Semi Supervised Learners", Jun. 17, 2020.
Chen et al, "Improved Baselines with Momentum Contrastive Learning", arXiv:2003v1, Mar. 9, 2020, 3 pages.
Chen et al, "A Simple Framework for Contrastive Learning of Visual Representations", arXiv:2002v3, Jul. 1, 2020, 20 pages.
Chen et al, "On Sampling Strategies for Neural Network-Based Collaborative Filtering", arXiv:1706v1, Jun. 23, 2017, 14 pages.
Chen et al, "Self-Supervised GANs via Auxiliary Rotation Loss", Conference on Computer Vision and Pattern Recognition, 2019, pp. 12154-12163.
Cimpoi et al, "Describing Textures in the Wild", Conference on Computer Vision and Pattern Recognition, 8 pages.
Cubuk et al, "Autoaugment: Learning Augmentation Strategies from Data", Conference on Computer Vision and Pattern Recognition, 11 pages.
Dai et al, "Semi-Supervised Sequence Learning", arXiv:1511v1, Nov. 4, 2015, 10 pages.
Devlin et al, "BERT: Pre-Training of Deep Bidirectional Transformers for Language Understanding", arXiv:1810v2, May 24, 2019, 16 pages.
DeVries et al, "Improved Regularization of Convolutional Neural Networks with Cutout", arXiv:1708v2, Nov. 29, 2017, 8 pages.
Doersch et al, "Unsupervised Visual Representation Learning by Context Prediction", arXiv:1505v3, Jan. 16, 2016, 10 pages.
Donahue et al, "Adversarial Feature Learning", arXiv:1605v7, Apr. 3, 2017, 18 pages.
Donahue et al, "DeCAF: A Deep Convolutional Activation Feature for Generic Visual Recognition", arXiv:1310v1, Oct. 6, 2013, 10 pages.
Donahue et al, "Large Scale Adversarial Representation Learning", arXiv:1907v1, Jul. 4, 2019, 29 pages.
Dosovitskiy et al, "Discriminative Unsupervised Feature Learning with Convolutional Neural Networks", Advances in Neural Information Processing Systems, 9 pages.
Everingham et al, "The Pascal Visual Object Classes (VOC) Challenge", International Journal of Computer Vision, 34 pages.
Fei-Fei et al, "Learning Generative Visual Models from Few Training Examples: An Incremental Bayesian Approach Tested on 101 Object Categories", Conference on Computer Vision and Pattern Recognition, 12 pages.
Gidaris et al, "Unsupervised Representation Learning by Predicting Image Rotations", arXiv:1803v1, Mar. 21, 2018, 16 pages.
Goodfellow et al, "Generative Adversarial Nets", arXiv:1406v1, Jun. 10, 2014, 9 pages.
Goyal et al., "Accurate, Large Minibatch SGD: Training ImageNet in 1 Hour", arXiv:1706v2, Apr. 30, 2018, 12 pages.
Goyal et al, "Scaling and Benchmarking Self-Supervised Visual Representation Learning", arXiv:1905v2, Jun. 6, 2019, 22 pages.
Grill et al., "Bootstrap Your Own a new Approach to Self Supervised Learning", arxiv.org, Jun. 13, 2020.
Gross et al, "Training and Investigating Residual Nets", The Torch Blog, http://torch.ch/blog/2016/02/04/resnets.html, retrieved on Sep. 16, 2020, 8 pages.
Gutmann et al, "Noise-Contrastive Estimation: A New Estimation Principle for Unnormalized Statistical Models", Proceedings of the Thirteenth International Conference on Artificial Intelligence and Statistics, pp. 297-304.
Hadsell et al, "Dimensionality Reduction by Learning an Invariant Mapping", Conference on Computer Vision and Pattern Recognition, 8 pages.
Hamilton et al, "Inductive Representation Learning on Large Graphs", arXiv:1706v4, Sep. 10, 2018, 19 pages.
He et al, "Bag of Tricks for Image Classification with Convolutional Neural Networks", arXiv:1812v2, Dec. 5, 2018, 10 pages.
He et al, "Deep Residual Learning for Image Recognition", arXiv:1512v1, Dec. 10, 2015, 12 pages.
He et al, "Momentum Contrast for Unsupervised Visual Representation Learning", arXiv:1911v3, Mar. 23, 2020, 12 pages.
He et al, "Rethinking ImageNet Pre-Training", arXiv:1811v1, Nov. 21, 2018, 10 pages.
Henaff et al, "Data-Efficient Image Recognition with Contrastive Predictive Coding", arXiv:1905v3, Jul. 1, 2020, 13 pages.
Henriques, et al, "Invariant Information Clustering for Unsupervised Image Classification and Segmentation", arXiv:1807v4, Aug. 22, 2019, 10 pages.
Hinton et al, "A Fast Learning Algorithm for Deep Belief Nets", Neural Computation, vol. 18, 16 pages.
Hinton et al, "Distilling the Knowledge in a Neural Network", arXiv:1503v1, Mar. 9, 2015, 9 pages.

(56) References Cited

OTHER PUBLICATIONS

Hjelm et al, "Learning Deep Representations by Mutual Information Estimation and Maximization", arXiv:1808v5, Feb. 22, 2019, 24 pages.
Howard, "Some Improvements on Deep Convolutional Neural Network Based Image Classification", arXiv:1312v1, 6 pages.
Ioffe et al, "Batch normalization: Accelerating Deep Network Training by Reducing Internal Covariate Shift", arXiv:1502v3, Mar. 2, 2015, 11 pages.
Kingma et al, "Auto-Encoding Variational Bayes", arXiv:1312v10, May 1, 2014, 14 pages.
Kiros et al, "Skip-Thought Vectors", arXiv:1506v1, Jun. 22, 2015, 11 pages.
Kolesnikov et al, "Big Transfer (BiT): General Visual Representation Learning", arXiv:1912v3, May 5, 2020, 28 pages.
Kolesnikov et al, "Revisiting Self-Supervised Visual Representation Learning", arXiv:1901v1, Jan. 25, 2019, 13 pages.
Kornblith et al, "Do Better ImageNet Models Transfer Better?", arXiv:1805v3, Jun. 17, 2019, 24 pages.
Krause et al., "Collecting a Large-Scale Dataset of Fine-Grained Cars", Second Workshop on Fine-Grained Visual Categorization, 2 pages.
Krizhevsky et al, "Imagenet Classification with Deep Convolutional Neural Networks", Advances in Neural Information Processing Systems, 9 pages.
Lee, "Pseudo-Label: The Simple and Efficient Semi-Supervised Learning Method for Deep Neural Networks", International Council for Machinery Lubrication, Atlanta, Georgia, 2013, 6 pages.
Li et al, "Selective Kernel Networks", arXiv:1903v2, Mar. 18, 2019, 12 pages.
Linsker, "Self-Organization in a Perceptual Network", Computer, Mar. 1988, pp. 105-117.
Loshchilov et al, "Decoupled Weight Decay Regularization", arXiv:1711v3, Jan. 4, 2019, 19 pages.
Loshchilov et al, "SGDR: Stochastic Gradient Descent with Warm Restarts", arXiv:1608v5, May 3, 2017, 16 pages.
Maaten et al, "Visualizing Data Using t-SNE" Journal of Machine Learning Research, vol. 9, 2008, 27 pages.
Maji et al, "Fine-Grained Visual Classification of Aircraft", arXiv:1306v1, Jun. 21, 2013, 6 pages.
Mikolov et al, "Efficient Estimation of Word Representations in Vector Space", arXiv:1301v3, Sep. 7, 2013, 12 pages.
Misra et al, "Self-Supervised Learning of Pretext-Invariant Representations", arXiv:1912v1, Dec. 4, 2019, 14 pages.
Nilsback et al, "Automated Flower Classification Over a Large Number of Classes", Computer Vision, Graphics & Image Processing, 2008, 8 pages.
Noroozi et al, "Unsupervised Learning of Visual Representations by Solving Jigsaw Puzzles", arXiv:1603v3, Aug. 22, 2017, 19 pages.
Oliver et al, "Realistic Evaluation of Deep Semi-Supervised Learning Algorithms", arXiv:1804v4, Jun. 17, 2019, 19 pages.
Oord et al, "Representation Learning with Contrastive Predictive Coding", arXiv:1807v2, Jan. 22, 2019, 13 pages.
Parkhi et al, "Cats and Dogs", Conference on Computer Vision and Pattern Recognition, 8 pages.
Peters, "Deep Contextualized Word Representations", arXiv:1802v2, Mar. 22, 2018, 15 pages.
Pham et al, "Meta Pseudo Labels", arXiv:2003v2, Apr. 23, 2020, 12 pages.
Radford et al, "Improving Language Understanding by Generative Pre-Training", OpenAI, 2018, 12 pages.
Radford et al, "Language Models are Unsupervised Multitask Learners", OpenAI, 24 pages.
Rendle et al, "Bayesian Personalized Ranking from Implicit Feedback", arXiv:1205, 10 pages.
Russakovsky et al, "Imagenet Large Scale Visual Recognition Challenge", arXiv:1409v3, Jan. 30, 2015, 43 pages.
Schroff et al, "Facenet: A Unified Embedding for Face Recognition and Clustering", arXiv:1503v3, Jun. 17, 2015, 10 pages.
Simonyan et al, "Very Deep Convolutional Networks for Largescale Image Recognition", arXiv:1409v6, Apr. 10, 2015, 14 pages.
Sohn et al, "FixMatch: Simplifying Semi-Supervised Learning with Consistency and Confidence", arXiv:2001v1, Jan. 21, 2020, 14 pages.
Sohn, "Improved Deep Metric Learning with Multi-Class N-Pair Loss Objective", Conference on Neural Information Processing Systems, 2016, 9 pages.
Szegedy et al, "Going Deeper with Convolutions", arXiv:1409v1, Sep. 17, 2014, 12 pages.
Szegedy et al, "Rethinking the Inception Architecture for Computer Vision", arXiv:1512v3, Dec. 11, 2015, 10 pages.
Tian et al, "Contrastive Multiview Coding", arXiv:1906v4, Mar. 11, 2020, 16 pages.
Tian et al, "Contrastive Representation Distillation", 2019.
Tschannen et al, "On Mutual Information Maximization for Representation Learning", arXiv:1907v2, Jan. 23, 2020, 16 pages.
V.R. de Sa, "Learning Classification with Unlabeled Data", Advances in Neural Information Processing Systems, pp. 112-119.
Verma et al, "Interpolation Consistency Training for Semi-Supervised Learning", arXiv:1903v3, May 19, 2019, 10 pages.
Wu et al, "Unsupervised Feature Learning via Non-Parametric Instance Discrimination", Conference on Computer Vision and Pattern Recognition, 10 pages.
Xiao et al, "SUN database: Large-Scale Scene Recognition from Abbey to Zoo", Conference on Computer Vision and Pattern Recognition, 8 pages.
Xie et al, "Self-Training with Noisy Student Improves ImageNet Classification", arXiv:1911v4, Jun. 19, 2020, 18 pages.
Xie et al, "Unsupervised Data Augmentation", arXiv:1904, 23 pages.
Yalniz et al, "Billion-Scale Semi-SupervisedLearning for Image Classification", arXiv:1905v1, May 2, 2019, 12 pages.
Ye et al, "Unsupervised Embedding Learning via Invariant and Spreading Instance Feature", Conference on Computer Vision and Pattern Recognition, pp. 6210-6219.
You et al, "Large Batch Training of Convolutional Networks", arXiv:1708v3, Sep. 13, 2017, 8 pages.
Zhai et al, "S4L: Self-Supervised Semi-Supervised Learning", arXiv:1905v2, Jul. 23, 2019, 13 pages.
Zhang et al, "Colorful Image Colorization", arXiv:1603v5, Oct. 5, 2016, 29 pages.
Zhuang et al, "Local Aggregation for Unsupervised Learning of Visual Embeddings", arXiv:1903v2, Apr. 10, 2019, 13 pages.

* cited by examiner

| Name | Negative loss function | Gradient w.r.t. $u$ |
|---|---|---|
| NT-Xent | $u^T v^+/\tau - \log \sum_{v \in \{v^+, v^-\}} \exp(u^T v/\tau)$ | $(1 - \frac{\exp(u^T v^+/\tau)}{Z(u)})/\tau v^+ - \sum_{v^- \in \{v^+, v^-\}} \frac{\exp(u^T v^-/\tau)}{Z(u)}/\tau v^-$ |
| NT-Logistic | $\log \sigma(u^T v^+/\tau) + \log \sigma(-u^T v^-/\tau)$ | $(\sigma(-u^T v^+/\tau))/\tau v^+ - \sigma(u^T v^-/\tau)/\tau v^-$ |
| Margin Triplet | $-\max(u^T v^- - u^T v^+ + m, 0)$ | $v^+ - v^-$ if $u^T v^+ - u^T v^- < m$ else $0$ |

Figure 9

SYSTEMS AND METHODS FOR CONTRASTIVE LEARNING OF VISUAL REPRESENTATIONS

PRIORITY CLAIM

The present application is a continuation of U.S. application Ser. No. 17/018,372 having a filing date of Sep. 11, 2020, which is a continuation-in-part of U.S. patent application Ser. No. 16/847,163 filed Apr. 13, 2020. Applicant claims priority to and the benefit of each of such applications and incorporate all such applications herein by reference in its entirety.

FIELD

The present disclosure generally relates to systems and methods for contrastive learning of visual representations. More particularly, the present disclosure relates to contrastive learning frameworks that leverage data augmentation and a learnable nonlinear transformation between the representation and the contrastive loss to provide improved visual representations.

BACKGROUND

Learning effective visual representations without human supervision is a long-standing problem. Most mainstream approaches fall into one of two classes: generative or discriminative. Generative approaches learn to generate or otherwise model pixels in the input space. However, pixel-level generation is computationally expensive and may not be necessary for representation learning. Discriminative approaches learn representations using objective functions similar to those used for supervised learning, but train networks to perform pretext tasks where both the inputs and labels are derived from an unlabeled dataset. Many such approaches have relied on heuristics to design pretext tasks. These heuristics often limit the generality of the learned representations.

For example, many existing approaches define contrastive prediction tasks by changing the architecture of the model to be learned. As examples, Hjelm et al. (2018) and Bachman et al. (2019) achieve global-to-local view prediction via constraining the receptive field in the network architecture, whereas Oord et al. (2018) and Hénaff et al. (2019) achieve neighboring view prediction via a fixed image splitting procedure and a context aggregation network. However, these custom architectures add additional complexity and reduce the flexibility and/or applicability of the resulting model.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to perform semi-supervised contrastive learning of visual representations. The method includes, obtaining a training image in a set of one or more unlabeled training images, performing a plurality of first augmentation operations on the training image to obtain a first augmented image, separate from performing the plurality of first augmentation operations, performing a plurality of second augmentation operations on the training image to obtain a second augmented image, respectively processing, with a base encoder neural network, the first augmented image and the second augmented image to respectively generate a first intermediate representation for the first augmented image and a second intermediate representation for the second augmented image, respectively processing, with a projection head neural network comprising a plurality of layers, the first intermediate representation and the second intermediate representation to respectively generate a first projected representation for the first augmented image and a second projected representation for the second augmented image, evaluating a loss function that evaluates a difference between the first projected representation and the second projected representation, modifying one or more values of one or more parameters of one or both of the base encoder neural network and the projection head neural network based at least in part on the loss function, after said modifying, generating an image classification model from the base encoder neural network and the projection head neural network, the image classification model comprising some but not all of the plurality of layers of the projection head neural network, performing fine-tuning of the image classification model based on a set of labeled images, and after performing the fine-tuning, performing distillation training using the set of unlabeled training images, wherein the distillation training distills the image classification model to a student model comprising a relatively smaller number of parameters relative to the image classification model.

Another example aspect of the present disclosure is directed to a computing system to perform semi-supervised contrastive learning of visual representations. The computing system includes one or more processors and one or more non-transitory computer-readable media that collectively store: an image classification model comprising a base encoder neural network, one or more projection head neural network layers, and a classification head, where the base encoder neural network and the one or more projection head neural network layers have been pretrained using contrastive learning based on a set of one or more unlabeled visual data, and where the one or more projection head neural network layers comprise some but not all of a plurality of projection head neural network layers from a projection head neural network, and instructions that, when executed by the one or more processors, cause the computing system to perform operations that include: performing fine-tuning of the image classification model using a set of one or more labeled visual data, and after performing the fine-tuning of the image classification model, performing distillation training using the one or more projection head neural network layers pretrained using contrastive learning, where the distillation training distills the image classification model to a student model comprising a relatively smaller number of parameters relative to the image classification model.

Another example aspect of the present disclosure is directed to a computer-implemented method to perform semi-supervised contrastive learning. The method includes, performing contrastive learning based on a set of one or more unlabeled training data, generating an image classification model based on a base encoder neural network used in performing the contrastive learning and based on some but not all of a plurality of layers in a projection head neural network used in performing the contrastive learning, performing fine-tuning of the image classification model based on a set of one or more labeled training data, and after performing the fine-tuning of the image classification model, performing distillation training using the set of unlabeled training data, the distillation training distilling the image classification model to a student model comprising a relatively smaller number of parameters relative to the image classification model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Detailed discussion of embodiments directed to one of ordinary skill in the art is set forth in the specification, which makes reference to the appended figures, in which:

FIG. 9 provides example negative loss functions and their gradients according to example embodiments of the present disclosure.

Figure 1:
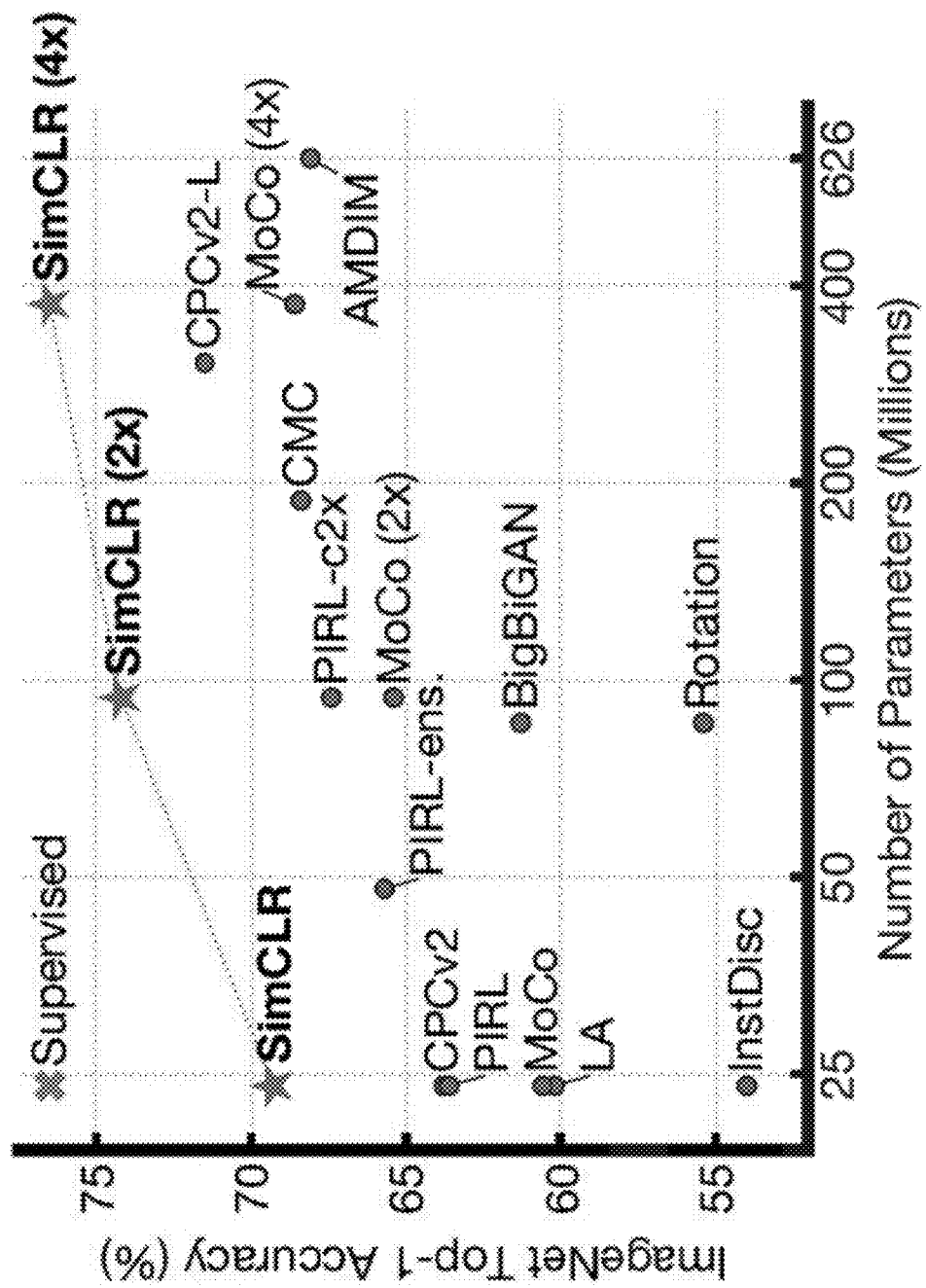
FIG. 1 depicts an example plot of accuracy of different linear classifiers trained on representations learned via different techniques including example embodiments of the present disclosure.

Reference numerals that are repeated across plural figures are intended to identify the same features in various implementations.

DETAILED DESCRIPTION

Overview

Example aspects of the present disclosure are directed to systems and methods for contrastive learning and semi-supervised contrastive learning of visual representations. In particular, the present disclosure provides systems and methods that leverage particular data augmentation schemes and a learnable nonlinear transformation between the representation and the contrastive loss to provide improved visual representations. In contrast to certain existing techniques, the contrastive self-supervised learning algorithms described herein do not require specialized architectures or a memory bank. Some example implementations of the proposed approaches can be referred to as a simple framework for contrastive learning of representations or "SimCLR" and associated configurations for performing semi-supervised contrastive learning. Further example aspects are described below and provide the following benefits and insights.

One example aspect of the present disclosure is directed to particular compositions of data augmentations which enable the system to define effective predictive tasks. Composition of multiple data augmentation operations is crucial in defining the contrastive prediction tasks that yield effective representations. As one example, a combination of random crop and color distortions provides particular benefit. In addition, unsupervised contrastive learning benefits from stronger data augmentation than supervised learning.

Another example aspect is directed to model frameworks which include a learnable nonlinear transformation between the representation and the contrastive loss. Introducing a learnable nonlinear transformation between the representation and the contrastive loss substantially improves the quality of the learned representations which may be due, at least in part, to preventing information loss in the representation.

According to another example aspect, specific embodiments are identified and evaluated in which contrastive learning benefits from larger batch sizes and more training steps, for example, as compared to supervised learning. As one example, representation learning with contrastive cross entropy loss benefits from normalized embeddings and an appropriately adjusted temperature parameter. Like supervised learning, contrastive learning also benefits from deeper and wider networks.

According to yet another example aspect, various examples of performing semi-supervised contrastive learning are provided. As one example, first a deep and wide network is pretrained using unlabeled data, next the network is incorporated with some but not all of a plurality of pretrained projection head neural network layers and is fine-tuned with a small number or fraction of labeled data, and then distillation training is performed based on reusing the unlabeled pretraining data to distill the network to a student network that performs one or more specialized tasks. Such semi-supervised contrastive learning improves accuracy and computational efficiency over previously known methods.

Example implementations of the proposed systems are then empirically shown to considerably outperform previous methods for self-supervised and semi-supervised learning on ImageNet. In particular, a linear classifier trained on self-supervised representations learned by example implementations of the proposed systems and methods achieves 76.5% top-1 accuracy, which is a 7% relative improvement over previous state-of-the-art, matching the performance of a supervised ResNet-50. As one example, FIG. 1 illustrates ImageNet Top-1 accuracy of linear classifiers trained on representations learned with different self-supervised methods (pretrained on ImageNet). The gray cross indicates supervised ResNet-50. Example implementations of the proposed method referred to as SimCLR are shown in bold. Further, when fine-tuned on only 1% of the labels, example implementations of the proposed techniques achieve 85.8% top-5 accuracy, outperforming AlexNet with 100 fewer labels. When fine-tuned on other natural image classification datasets, SimCLR performs on par with or better than a strong supervised baseline on 10 out of 12 datasets.

Thus, the present disclosure provides a simple framework and its instantiation for contrastive visual representation learning. Its components are carefully studied and the effects of different design choices are demonstrated. By combining these findings, the proposed systems and methods improve considerably over previous methods for self-supervised, semi-supervised, and transfer learning. Specifically, the discussion and results contained herein demonstrate that the complexity of some previous methods for self-supervised learning is not necessary to achieve good performance.

The systems and methods of the present disclosure provide a number of technical effects and benefits. As one example, the contrastive learning techniques described herein can result in models which generate improved visual representations. These visual representations can then be used to make more accurate downstream decisions (e.g., more accurate object detections, classifications, segmentations, etc.). Thus, the techniques described herein result in improved performance of a computer vision system.

As another example technical effect and benefit, and in contrast to various existing approaches, the contrastive learning techniques described herein do not require use of a memory bank. By obviating the need for a dedicated memory bank, the proposed techniques can reduce memory load, thereby conserving computing resources such as memory resources.

As another example technical effect and benefit, and in contrast to various existing approaches, the contrastive learning techniques described herein do not require specialized, custom, or otherwise unduly complex model architectures to enable contrastive learning. By obviating the need for complex architectures, more simplified architectures can be used, resulting in models which run faster (e.g., reduced latency) and consume fewer computing resources (e.g., reduced usage of processors, memory, network bandwidth, etc.)

With reference now to the Figures, example embodiments of the present disclosure will be discussed in further detail.

Example Contrastive Learning Techniques

Example Contrastive Learning Framework

Figure 2A:
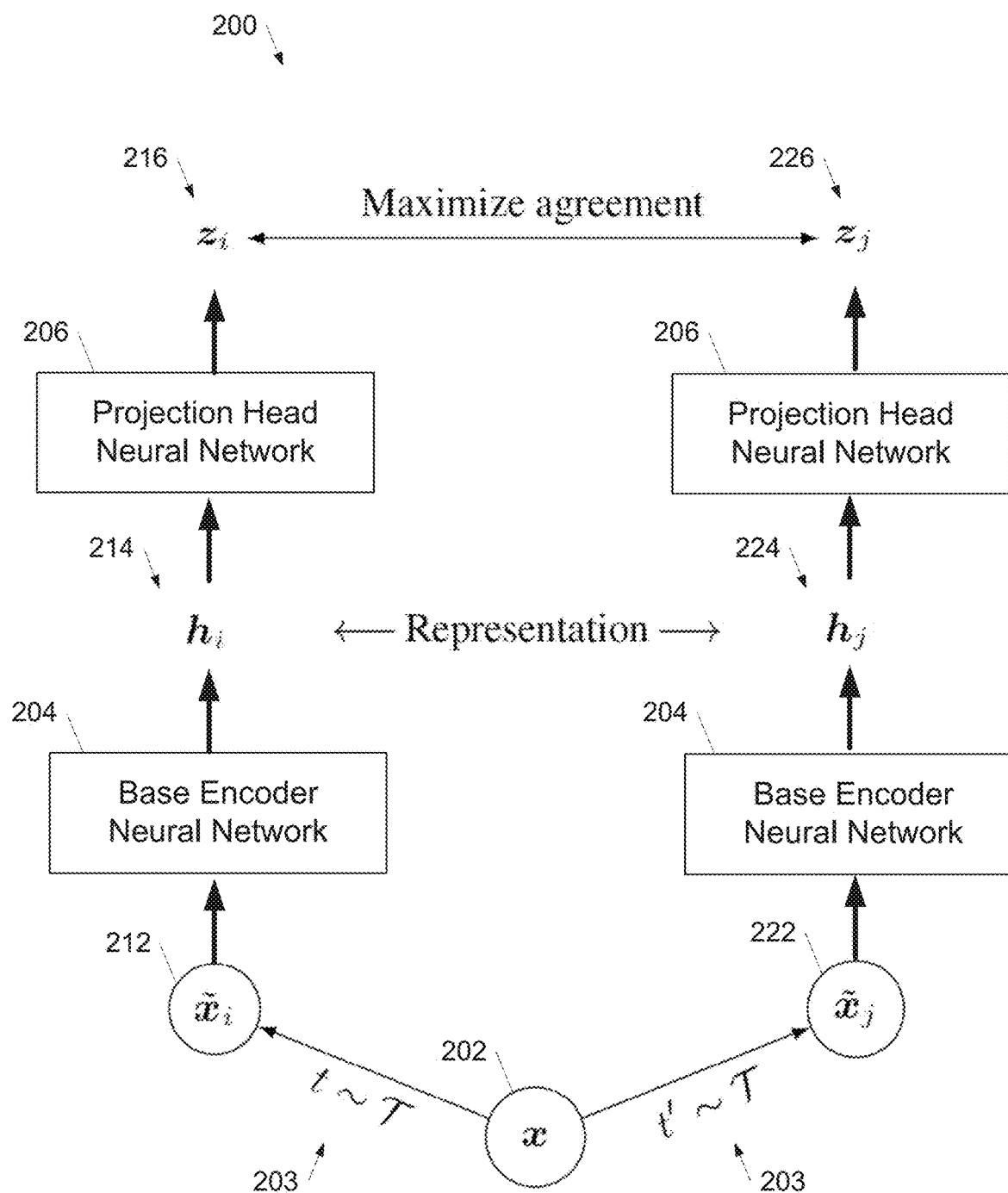
FIG. 2A depicts a graphical diagram of a framework for contrastive learning according to example embodiments of the present disclosure.

Example implementations of the present disclosure learn representations by maximizing agreement between differently augmented views of the same data example via a contrastive loss in the latent space. As illustrated in FIG. 2A, an example framework 200 can include the following four major components:

A stochastic data augmentation module (shown generally at 203) that transforms any given data example (e.g., an input image x shown at 202) randomly resulting in two correlated views of the same example, denoted $\tilde{x}_i$ and $\tilde{x}_j$, which are shown at 212 and 222, respectively. These augmented images 212 and 222 can be considered as a positive pair. Although the present disclosure focuses on data examples from the image domain for ease of explanation, the framework is extensible to data examples of different domains as well which are susceptible to augmentation of some kind, including text and/or audio domains. Example types of images that can be used include video frames, LiDAR point clouds, computed tomography scans, X-ray images, hyper-spectral images, and/or various other forms of imagery.

In some example implementations, three augmentations can be applied at 203: random cropping followed by resize back to the original size, random color distortions, and random Gaussian blur. As shown in the following sections, the combination of random crop and color distortion significantly assists in providing a good performance. However, various other combinations of augmentations can be performed.

A base encoder neural network 204 (represented in notation herein as $f(\cdot)$) that extracts intermediate representation vectors from augmented data examples. For example, in the illustration of FIG. 2A, the base encoder neural network 204 has generated intermediate representations 214 and 224 from augmented images 212 and 222, respectively. The example framework 200 allows various choices of the network architecture without any constraints. Some example implementations opt for simplicity and adopt the ResNet architecture (He et al., 2016) to obtain $h_i = f(\tilde{x}_i) = \text{ResNet}(\tilde{x}_i)$ where $h_i \in \mathbb{R}^d$ is the output after the average pooling layer.

A projection head neural network 206 (represented in the notation herein as $g(\cdot)$) that maps the intermediate representations to final representations within the space where contrastive loss is applied. For example, the projection head neural network 206 has generated final representations 216 and 226 from the intermediate representations 214 and 224, respectively. In some example implementations of the present disclosure, the projection head neural network 206 can be a multi-layer perceptron with one hidden layer to obtain $z_i = g(h) = W^{(2)}\sigma(W^{(1)}h_i)$ where $\sigma$ is a ReLU non-linearity. As shown in the following sections, it is beneficial to define the contrastive loss on final representations $z_i$'s rather than intermediate representations $h_i$'s.

A contrastive loss function can be defined for a contrastive prediction task. As one example, given a set $\{\tilde{x}_k\}$ including a positive pair of examples $\tilde{x}_i$ 212 and $\tilde{x}_j$ 222, the contrastive prediction task aims to identify $\tilde{x}_j$ in $\{\tilde{x}_k\}_{k \neq i}$ for a given $\tilde{x}_i$, e.g., based on similarly between their respective final representations 216 and 226.

In some implementations, to perform training within the illustrated framework, a minibatch of N examples can be randomly sampled and the contrastive prediction task can be defined on pairs of augmented examples derived from the minibatch, resulting in 2N data points. In some implementations, negative examples are not explicitly sampled. Instead, given a positive pair, the other 2(N−1) augmented examples within a minibatch can be treated as negative examples. Let $sim(u,v)=u^T v/\|u\|\|v\|$ denote the cosine similarity between two vectors u and v. Then one example loss function for a positive pair of examples (i,j) can be defined as $$\ell_{i,j} = -\log \frac{\exp(\mathrm{sim}(z_i, z_j)/\tau)}{\sum_{k=1}^{2N} \mathbb{1}_{[k \neq i]} \exp(\mathrm{sim}(z_i, z_k)/\tau)}, \quad (1)$$

where $k \neq i \in \{0,1\}$ is an indicator function evaluating to 1 if $k \neq i$ and $\tau$ denotes a temperature parameter. The final loss can be computed across all positive pairs, both (i,j) and (j,i), in a minibatch. For convenience, this loss is referred to further herein as NT-Xent (the normalized temperature-scaled cross entropy loss).

The below example Algorithm 1 summarizes one example implementation of the proposed method:

---

Algorithm 1 – Example Learning Algorithm

--- input: batch size N, temperature constant $\tau$, structure of f, g, $\mathcal{T}$.
for sampled minibatch $\{x_k\}_{k=1}^N$ do
  for all k ∈ {1, ... ,N} do
    draw two augmentation functions t~$\mathcal{T}$, t'~$\mathcal{T}$
    # the first augmentation
    $\tilde{x}_{2k-1} = t(x_k)$
    $h_{2k-1} = f(\tilde{x}_{2k-1})$      # representation
    $z_{2k-1} = g(h_{2k-1})$      # projection
    # the second augmentation
    $\tilde{x}_{2k} = t'(x_k)$
    $h_{2k} = f(\tilde{x}_{2k})$      # representation
    $z_{2k} = g(h_{2k})$      # projection
  end for
  for all i ∈ {1, ... ,2N} and j ∈ {1, ... ,2N} do
    $s_{i,j} = z_i^T z_j / (\|z_i\| \|z_j\|)$    # pairwise similarity
  end for
  define $\ell(i,j)$ as $\ell(i,j) = -\log \frac{\exp(s_{i,j})}{\sum_{k=1}^{2N} \mathbb{1}_{[k \neq i]} \exp(s_{i,k})}$ $\mathcal{L} = \frac{1}{2N} \sum_{k=1}^{N} [\ell(2k-1, 2k) + \ell(2k, 2k-1)]$ update networks f and g to minimize $\mathcal{L}$
end for
return encoder network f(·), and optionally throw away g(·)

---

Figure 2B:
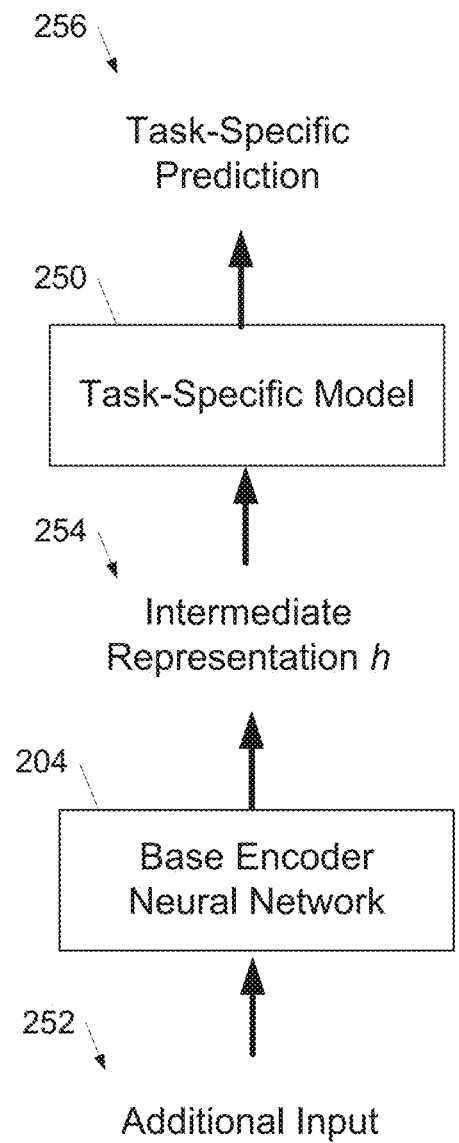
FIG. 2B depicts a graphical diagram of an example use of a base encoder neural network trained according to example frameworks according to example embodiments of the present disclosure.

FIG. 2B depicts a graphical diagram of an example use of a base encoder neural network trained after it has been trained in the example framework shown in FIG. 2A. In particular, the base encoder neural network 204 has been extracted and an additional task specific model 250 has been appended to the base encoder neural network 204. For example, the task specific model 250 can be any kind of model including linear models or non-linear models such as neural networks.

The task specific model 250 and/or the base encoder neural network 204 can be additionally trained (e.g., "fine-tuned") on additional training data (e.g., which may be task specific data). The additional training can be, for example, supervised learning training.

After fine-tuning, an additional input 252 can be provided to the base encoder neural network 204 which can produce an intermediate representation 254. The task-specific model 250 can receive and process the intermediate representation 254 to generate a task-specific prediction 256. As examples, the task-specific prediction 256 can be a classification prediction; a detection prediction; a recognition prediction; a segmentation prediction; and/or other prediction tasks.

Example Training with Large Batch Size

Example implementations of the present disclosure enable training of the model without use of a memory bank. Instead, in some implementations, the training batch size N can be varied from 256 to 8192. A batch size of 8192 provides 16382 negative examples per positive pair from both augmentation views. Training with large batch size may be unstable when using standard SGD/Momentum with linear learning rate scaling. To stabilize the training, the LARS optimizer (You et al. 2017) can be used for all batch sizes. In some implementations, the model can be trained with Cloud TPUs, using 32 to 128 cores depending on the batch size.

Global BN. Standard ResNets use batch normalization. In distributed training with data parallelism, the BN mean and variance are typically aggregated locally per device. In some example implementations of contrastive learning techniques described herein, as positive pairs are computed in the same device, the model can exploit the local information leakage to improve prediction accuracy without improving representations. For example, this issue can be addressed by aggregating BN mean and variance over all devices during the training. Other approaches include shuffling data examples or replacing BN with layer norm.

Example Evaluation Protocol

This subsection describes the protocol for example empirical studies described herein, which aim to understand different design choices in the proposed framework.

Example Dataset and Metrics. Most of the example studies for unsupervised pretraining (learning encoder network f without labels) are done using the ImageNet ILSVRC-2012 dataset (Russakovsky et al, 2015). The pretrained results are also tested on a wide range of datasets for transfer learning. To evaluate the learned representations, a linear evaluation protocol is followed where a linear classifier is trained on top of the frozen base network, and test accuracy is used as a proxy for representation quality. Beyond linear evaluation, comparisons are also made against state-of-the-art on semi-supervised and transfer learning.

Example Default Setting. Unless otherwise specified, for data augmentation in the example empirical experiments described herein, random crop and resize (with random flip), color distortions, and Gaussian blur are used; a ResNet-50 is used as the base encoder network; and a 2-layer MLP projection head is used to project the representation to a 128-dimensional latent space. As the loss, NT-Xent is used, optimized using LARS with linear learning rate scaling (i.e. LearningRate=0.3×BatchSize/256) and weight decay of $10^{-6}$. Training is performed at batch size 4096 for 100 epochs. Furthermore, linear warmup is used for the first 10 epochs and the learning rate is decayed with the cosine decay schedule without restarts.

Example Data Augmentation Techniques for Contrastive Representation Learning Data augmentation defines predictive tasks. Data augmentation has not been considered as a systematic way to define the contrastive prediction task. Many existing approaches define contrastive prediction tasks by changing the architecture Hjelm et al. (2018) and Bachman et al. (2019) achieve global-to-local view prediction via constraining the receptive field in the network architecture, whereas Oord et al. (2018) and Hénaff et al. (2019) achieve neighboring view prediction via a fixed image splitting procedure and a context aggregation network. However, these custom architectures add additional complexity and reduce the flexibility and/or applicability of the resulting model.

Figure 3B:
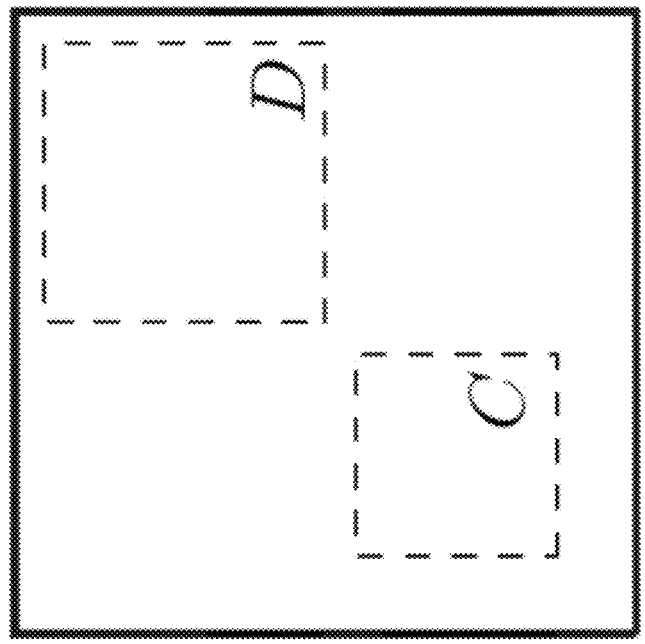
FIGS. 3A and 3B depict graphical diagrams of example random cropping outcomes on example images according to example embodiments of the present disclosure.
Figure 3A:
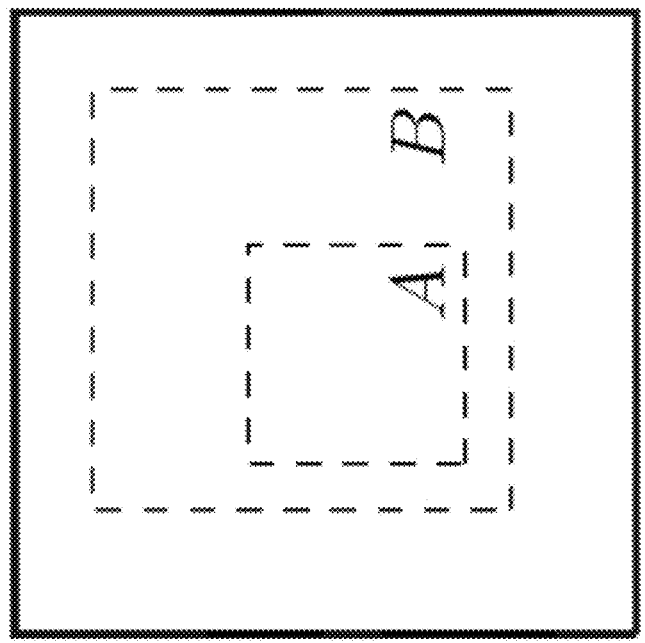

The techniques described herein can avoid this complexity by performing simple random cropping (with resizing) of target images, which creates a family of predictive tasks subsuming the above mentioned existing approaches. FIGS. 3A and 3B demonstrate this principle. FIG. 3A shows global and local views while FIG. 3B shows adjacent views. Specifically, solid rectangles are images, dashed rectangles are random crops. By randomly cropping images, the proposed systems can sample contrastive prediction tasks that include global to local view (B→A) or adjacent view (D→C) prediction.

This simple design choice conveniently decouples the predictive task from other components such as the neural network architecture. Broader contrastive prediction tasks can be defined by extending the family of augmentations and composing them stochastically.

Figure 4:
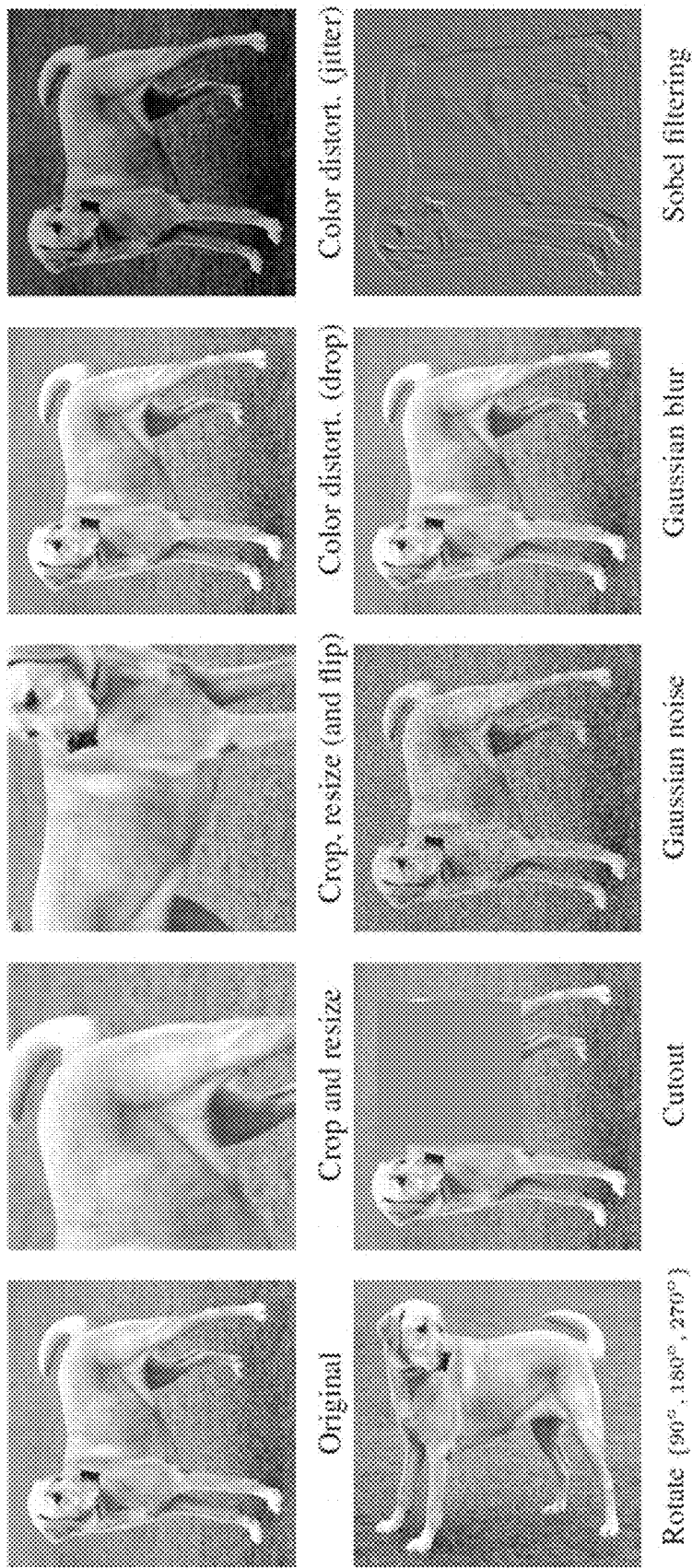
FIG. 4 provides example results of example data augmentation operations according to example embodiments of the present disclosure.

Composition of Data Augmentation Operations is Crucial for Learning Good Representations To systematically study the impact of data augmentation, several different augmentations were considered and can optionally be included in implementations of the present disclosure. One example type of augmentation involves spatial/geometric transformation of data, such as cropping and resizing (with horizontal flipping), rotation, and cutout. Another example type of augmentation involves appearance transformation, such as color distortion (including color dropping, brightness, contrast, saturation, hue), Gaussian blur, and Sobel filtering. FIG. 4 visualizes the augmentations were considered and can optionally be included in implementations of the present disclosure, which include the following examples visualized relative to the original image: crop and resize; crop, resize (and flip); color distortion (drop); color distortion (jitter); rotate; cutout; Gaussian noise; Gaussian blur; and Sobel filtering.

To understand the effects of individual data augmentations and the importance of augmentation composition, the performance of the proposed framework was evaluated when applying augmentations individually or in pairs. Since ImageNet images are of different sizes, example implementations used for evaluation consistently apply crop and resize images, which makes it difficult to study other augmentations in the absence of cropping. To eliminate this confound, an asymmetric data transformation setting was considered for this ablation. Specifically, the example implementations always first randomly crop images and resize them to the same resolution, and then apply the targeted transformation(s) only to one branch of the framework in FIG. 2A, while leaving the other branch as the identity (i.e. $t(x_i)=x_i$). Note that this asymmetric data augmentation hurts the performance. Nonetheless, this setup should not substantively change the impact of individual data augmentations or their compositions.

Figure 5:
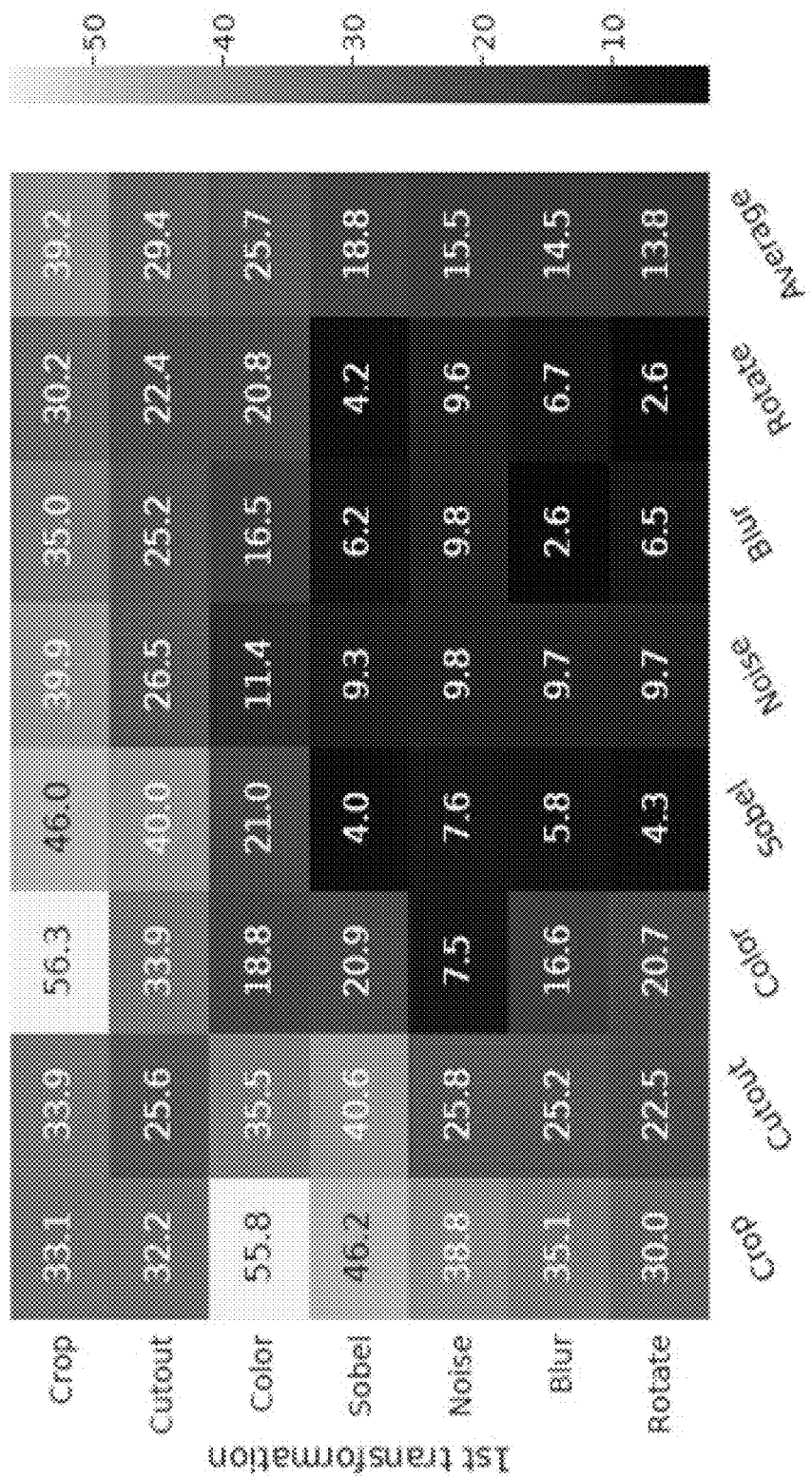
FIG. 5 provides example performance measurements for various data augmentation compositions according to example embodiments of the present disclosure.

FIG. 5 shows linear evaluation results under individual and composition of transformations. In particular, FIG. 5 shows linear evaluation (ImageNet top-1 accuracy) under individual or composition of data augmentations, applied only to one branch. For all columns by the last, diagonal entries correspond to single transformation, and off-diagonals correspond to composition of two transformations (applied sequentially). The last column reflects the average over the row.

It can be observed from FIG. 5 that no single transformation suffices to learn excellent representations, even though the model can almost perfectly identify the positive pairs in the contrastive task. When composing augmentations, the contrastive prediction task becomes harder, but the quality of representation improves dramatically.

Figure 6B:
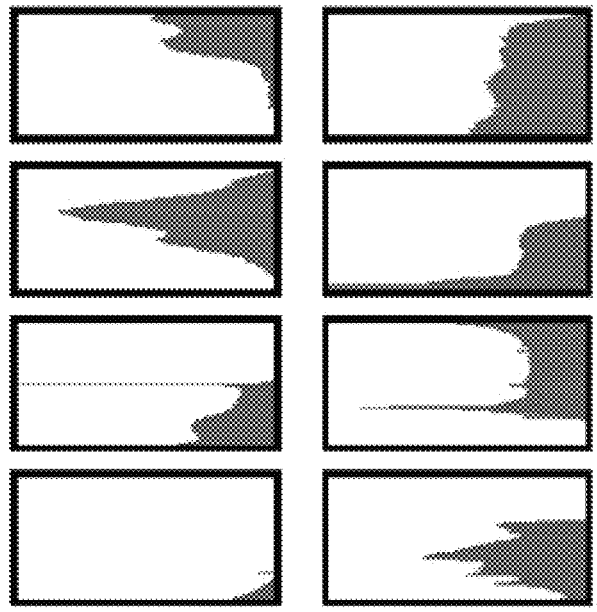
FIGS. 6A and 6B provide histograms that show the effect of example color distortion augmentation operations according to example embodiments of the present disclosure.
Figure 6A:
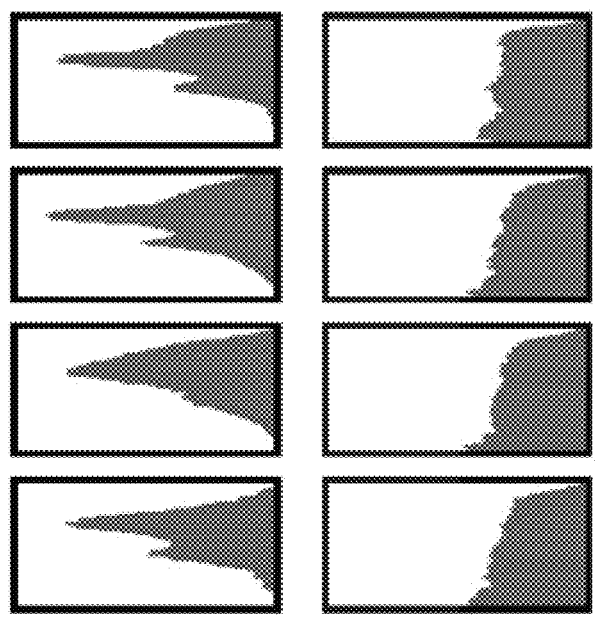

One composition of augmentations stands out: random cropping and random color distortion. One explanation is as follows: one serious issue when using only random cropping as data augmentation is that most patches from an image share a similar color distribution. FIGS. 6A and 6B shows that color histograms alone suffice to distinguish images. Neural nets may exploit this shortcut to solve the predictive task. Therefore, it is important to compose cropping with color distortion in order to learn generalizable features.

Specifically, FIGS. 6A and 6B show histograms of pixel intensities (over all channels) for different crops of two different images (i.e., two rows). FIG. 6A is without color distortion. FIG. 6B is with color distortion. The image for the first row is from FIG. 4. All axes have the same range.

Contrastive Learning Benefits from Stronger Data Augmentation than Supervised Learning To further demonstrate the importance of the color augmentation, the strength of color augmentation as adjusted as shown in Table 1. Stronger color augmentation substantially improves the linear evaluation of the learned unsupervised models. In this context, AutoAugment (Cubuk et al., 2019), a sophisticated augmentation policy found using supervised learning, does not work better than simple cropping+(stronger) color distortion. When training supervised models with the same set of augmentations, it was observed that stronger color augmentation does not improve or even hurts their performance. Thus, these experiments show that unsupervised contrastive learning benefits from stronger (color) data augmentation than supervised learning. As such, data augmentation that does not yield accuracy benefits for supervised learning can still help considerably with contrastive learning.

TABLE 1

Top-1 accuracy of unsupervised ResNet-50 using linear evaluation and
supervised ResNet-50, under varied color distortion strength and other data transformations.
Strength 1 (+Blur) is one example default data augmentation policy.

| Methods | Color distortion strength | | | | | AutoAug |
|---|---|---|---|---|---|---|
| | 1/8 | 1/4 | 1/2 | 1 | 1 (+Blur) | |
| SimCLR | 59.6 | 61.0 | 62.6 | 63.2 | 64.5 | 61.1 |
| Supervised | 77.0 | 76.7 | 76.5 | 75.7 | 75.4 | 77.1 |

Example Data Augmentation Details

Some example options for performing data augmentation operations are provided. Other options or details can be used additionally or alternatively to these specific example details.

Example Random Crop and Resize to 224×224: A crop of random size (uniform from 0.08 to 1.0 in area) of the original size and a random aspect ratio (default: of 3/4 to 4/3) of the original aspect ratio is made. This crop is resized to the original size. In some implementations, the random crop (with resize) is followed by a random horizontal/left-to-right flip with some probability (e.g., 50%). This is helpful but not essential. By removing this from the example default augmentation policy, the top-1 linear evaluation drops from 64.5% to 63.4% for our ResNet-50 model trained in 100 epochs.

Example Color Distortion Color distortion is composed by color jittering and color dropping. Stronger color jittering usually helps, so a strength parameter can be used. One example pseudo-code for an example color distortion operation using TensorFlow is as follows.

```
import tensorflow as tf
def color_distortion(image, s=1.0):
    # image is a tensor with value range in [0, 1].
    # s is the strength of color distortion.
    def color_jitter(x):
        # one can also shuffle the order of following augmentations
        # each time they are applied.
        x = tf.image.random_brightness (x, max_delta=0.8*s)
        x = tf.image.random_contrast (x, lower=1-0.8*s, upper=1+0.8*s)
        x = tf.image.random_saturation(x, lower=1-0.8*s, upper=1+0.8*s)
        x = tf.image.random_hue(x, max_delta=0.2*s)
        x = tf.clip_by_value(x, 0, 1)
        return x
    def color_drop(x):
        image = tf.image.rgb_to_grayscale (image)
        image = tf.tile(image, [1, 1, 3])
    # randomly apply transformation with probability p.
    image = random_apply(color_jitter, image, p=0.8)
    image = random_apply(color_drop, image, p=0.2)
    return image
```

One example pseudo-code for an example color distortion operation using Pytorch is as follows.

```
from torchvision import transforms
def get_color_distortion(s=1.0) :
    # s is the strength of color distortion.
    color_jitter = transforms.ColorJitter(0.8*s, 0.8*s, 0.8*s, 0.2*s)
    rnd_color_jitter = transforms.RandomApply([color_jitter], p=0.8)
    rnd_gray = transforms.RandomGrayscale(p=0.2)
    color_distort = transforms.Compose ([
        rnd_color_jitter,
        rnd_gray])
    return color_distort
```

Example Gaussian blur This augmentation is helpful, as it improves the ResNet-50 trained for 100 epochs from 63.2% to 64.5%. The image can be blurred with some probability (e.g., 50% of the time) using a Gaussian kernel. A random sample $\sigma \in [0.1, 2.0]$ can be obtained, and the kernel size can be set to be some percentage (e.g., 10%) of the image height/width.

Example Architectures for the Base Encoder and the Projection Head

Unsupervised Contrastive Learning Benefits (More) from Bigger Models

Figure 7:
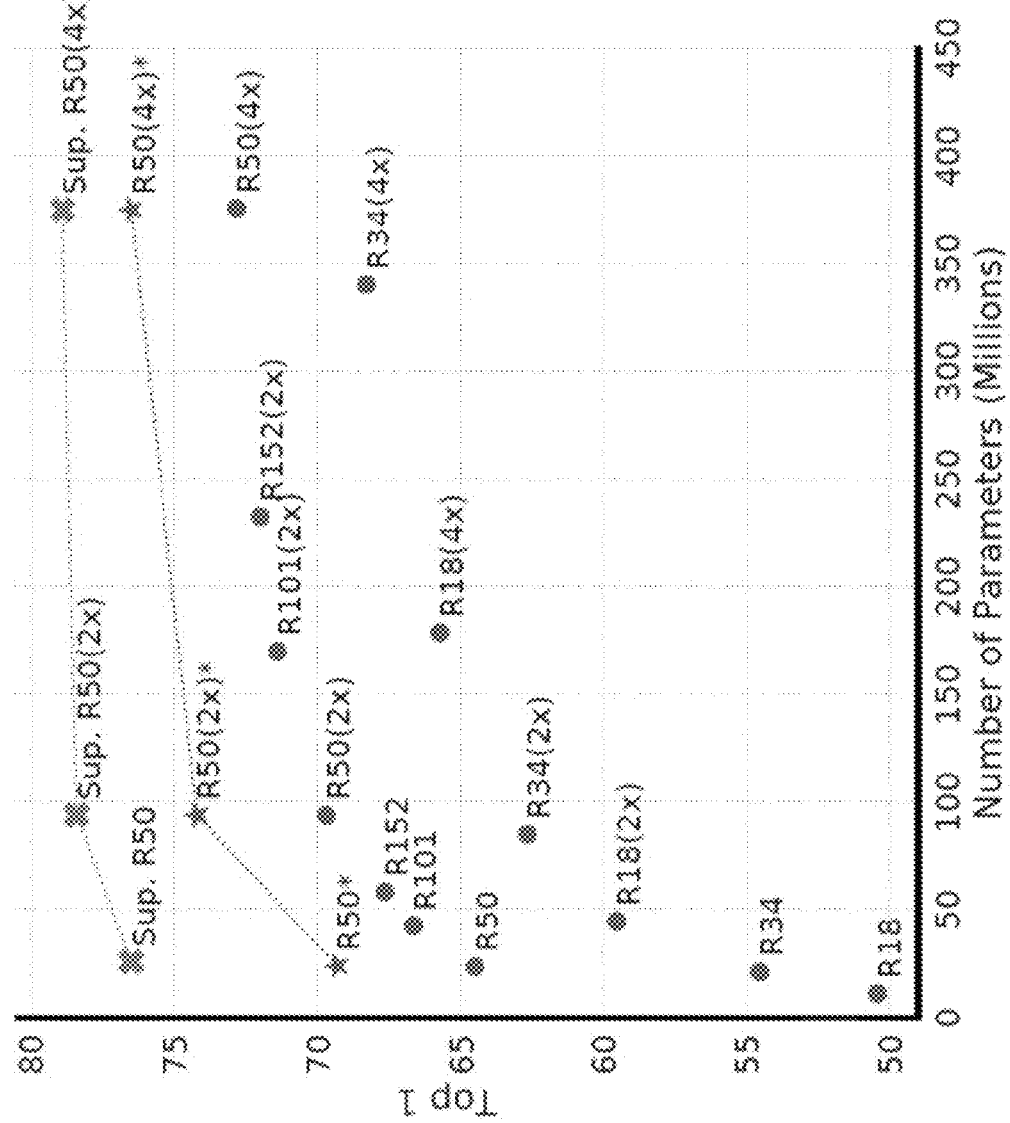
FIG. 7 provides linear evaluation results for example models with varied depth and width according to example embodiments of the present disclosure.

FIG. 7 shows that increasing depth and width both improve performance. While similar findings hold for supervised learning, the gap between supervised models and linear classifiers trained on unsupervised models shrinks as the model size increases, suggesting that unsupervised learning benefits more from bigger models than its supervised counterpart.

Specifically, FIG. 7 shows linear evaluation of models with varied depth and width. Models in blue dots are example implementations of the present disclosure trained for 100 epochs, models in red starts are example implementations of the present disclosure trained for 1000 epochs, and models in green crosses are supervised ResNets trained for 90 epochs. Training longer does not improve supervised ResNets.

Figure 8:
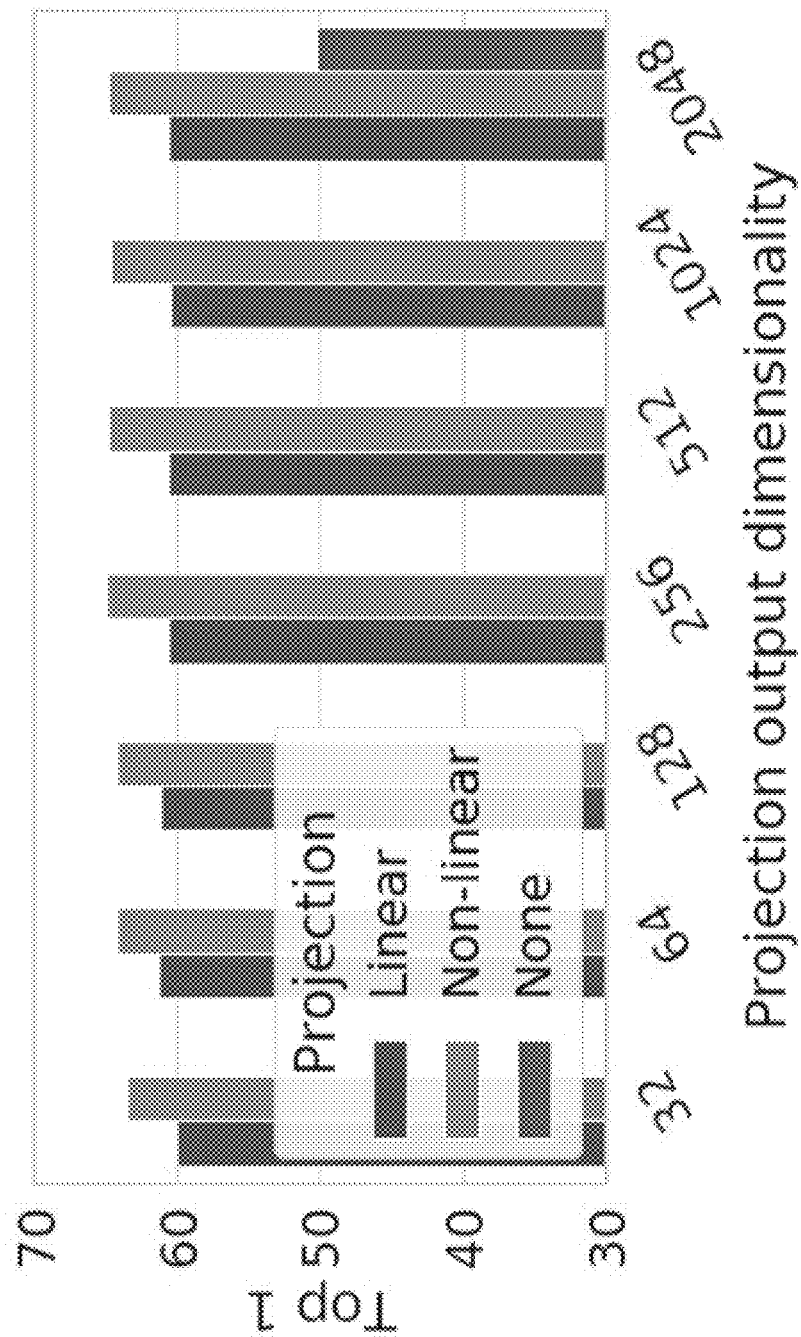
FIG. 8 provides linear evaluation results for example models with different projection heads according to example embodiments of the present disclosure.

A Nonlinear Projection Head Improves the Representation Quality of the Layer Before it Another example aspect evaluates the importance of including a projection head, i.e. g(h). FIG. 8 shows linear evaluation results using three different architectures for the head: (1) identity mapping; (2) linear projection; and (3) the default nonlinear projection with one additional hidden layer (and ReLU activation). Specifically, FIG. 8 shows linear evaluation of representations with different projection heads g and various dimensions of z=g(h). The representation h (before projection) is 2048-dimensional here.

It can be observed that a nonlinear projection is better than a linear projection (+3%), and much better than no projection (>10%). When a projection head is used, similar results are observed regardless of output dimension. Furthermore, even when nonlinear projection is used, the layer before the projection head, h, is still much better (>10%) than the layer after, z=g(h), which shows that the hidden layer before the projection head is a better representation than the layer after.

One explanation of this phenomenon is that the importance of using the representation before the nonlinear projection is due to loss of information induced by the contrastive loss. In particular, z=g(h) is trained to be invariant to data transformation. Thus, g can remove information that may be useful for the downstream task, such as the color or orientation of objects. By leveraging the nonlinear transformation g(•), more information can be formed and maintained in h. To verify this hypothesis, experiments were conducted that use either h or g(h) to learn to predict the transformation applied during the pretraining. Here it was set $g(h)=W^{(2)}\sigma(W^{(1)}h)$, with the same input and output dimensionality (i.e. 2048). Table 2 shows h contains much more information about the transformation applied, while g(h) loses information.

|  |  | Representation |  |
| --- | --- | --- | --- |
| What to predict? | Random guess | h | g(h) |
| Color vs grayscale | 80 | 99.3 | 97.4 |
| Rotation | 25 | 67.6 | 25.6 |
| Orig. vs corrupted | 50 | 99.5 | 59.6 |
| Orig. vs Sobel filtered | 50 | 96.6 | 56.3 |

Table 2 shows the accuracy of training additional MLPs on different representations to predict the transformation applied. Other than crop and color augmentation, rotation (one of {0,90,180,270}), Gaussian noise, and Sobel filtering transformation were additionally and independently added during the pretraining for the last three rows. Both h and g(h) are of the same dimensionality, i.e. 2048.

Example Loss Functions and Batch Size

Normalized Cross Entropy Loss with Adjustable Temperature Works Better than Alternatives Additional example experiments compared the NT-Xent loss against other commonly used contrastive loss functions, such as logistic loss (Mikolov et al., 2013), and margin loss (Schroff et al., 2015). FIG. 9 shows the objective function as well as the gradient to the input of the loss function. Specifically, FIG. 9 shows negative loss functions and their gradients. All input vectors i.e. u, $v^+$, $v^-$, are $\ell_2$ normalized. NT-Xent is an abbreviation for "Normalized Temperature-scaled Cross Entropy". Different loss functions impose different weightings of positive and negative examples.

Looking at the gradient, it can be observed that: 1) $l_2$ normalization along with temperature effectively weights different examples, and an appropriate temperature can help the model learn from hard negatives; and 2) unlike cross-entropy, other objective functions do not weigh the negatives by their relative hardness. As a result, one must apply semi-hard negative mining (Schroff et al., 2015) for these loss functions: instead of computing the gradient over all loss terms, one can compute the gradient using semi-hard negative terms (i.e., those that are within the loss margin and closest in distance, but farther than positive examples).

To make the comparisons fair, the same $l_2$ normalization was used for all loss functions, and we tune the hyperparameters, and report their best results. Table 3 shows that, while (semi-hard) negative mining helps, the best result is still much worse than NT-Xent loss.

TABLE 3

Linear evaluation (top-1) for models trained with different loss functions. "sh" means using semi-hard negative mining.

| Margin | NT-Logi. | Margin (sh) | NT-Logi. (sh) | NT-Xent |
| --- | --- | --- | --- | --- |
| 50.9 | 51.6 | 57.5 | 57.9 | 63.9 |

Another example set of experiments tested the importance of the $l_2$ normalization and temperature $\tau$ in the NT-Xent loss. Table 4 shows that without normalization and proper temperature scaling, performance is significantly worse. Without $l_2$ normalization, the contrastive task accuracy is higher, but the resulting representation is worse under linear evaluation.

TABLE 4

Linear evaluation for models trained with different choices of $\ell_2$ norm and temperature $\tau$ for NT-Xent loss. The contrastive distribution is over 4096 examples.

| $\ell_2$ norm? | $\tau$ | Entropy | Contrastive acc. | Top 1 |
| --- | --- | --- | --- | --- |
| Yes | 0.05 | 1.0 | 90.5 | 59.7 |
|  | 0.1 | 4.5 | 87.8 | 64.4 |
|  | 0.5 | 8.2 | 68.2 | 60.7 |
|  | 1 | 8.3 | 59.1 | 58.0 |
| No | 10 | 0.5 | 91.7 | 57.2 |
|  | 100 | 0.5 | 2.1 | 57.0 |

Figure 10:
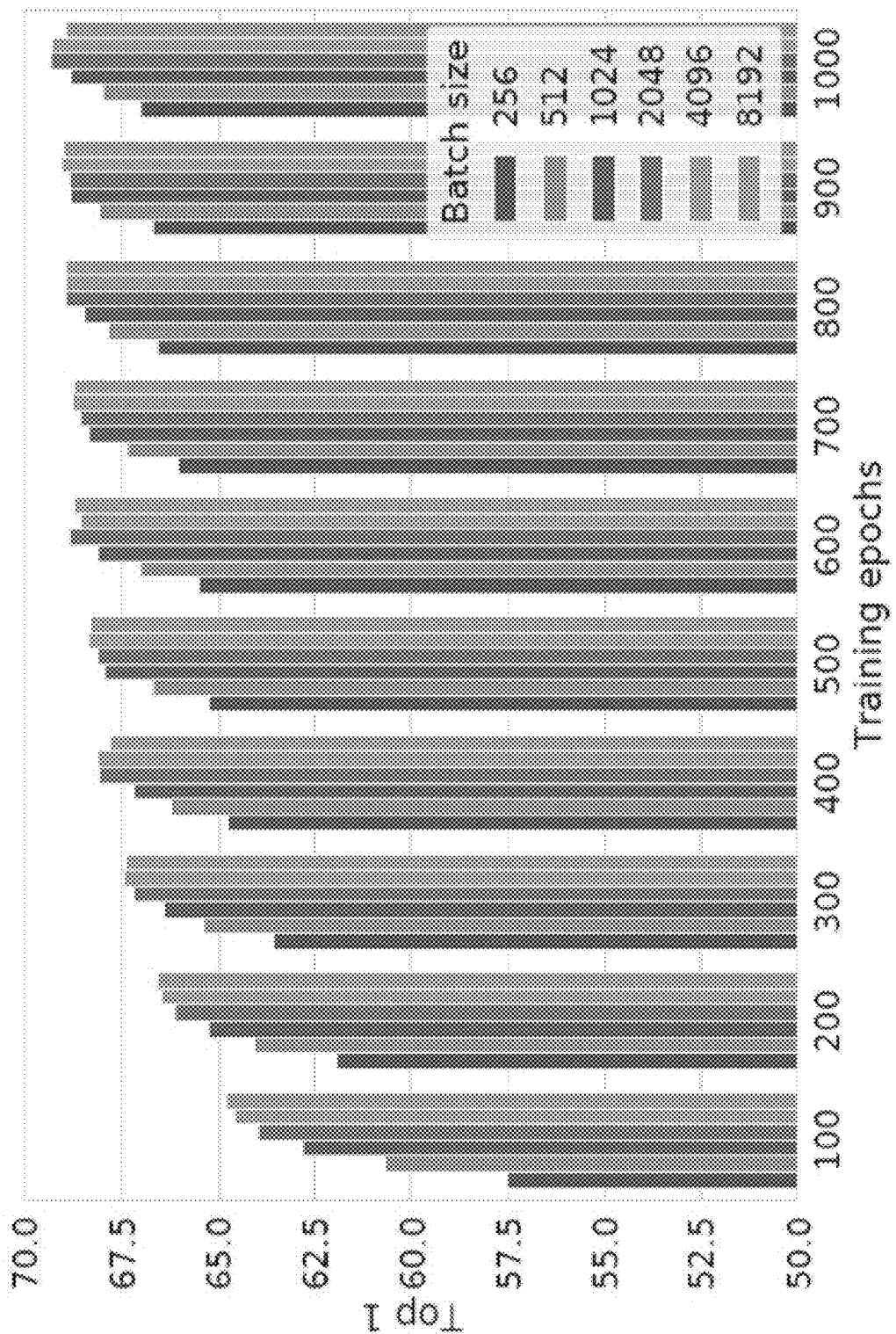
FIG. 10 provides linear evaluation results for example models with different batch size and number of epochs according to example embodiments of the present disclosure.

Contrastive Learning Benefits (More) from Larger Batch Sizes and Longer Training FIG. 10 shows the impact of batch size when models are trained for different numbers of epochs. In particular, FIG. 10 provides data for linear evaluation models (ResNet-50) trained with different batch size and epochs. Each bar is a single run from scratch.

When the number of training epochs is small (e.g. 100 epochs), larger batch sizes have a significant advantage over the smaller ones. With more training steps/epochs, the gaps between different batch sizes decrease or disappear, provided the batches are randomly resampled. In contrast to supervised learning, in contrastive learning, larger batch sizes provide more negative examples, facilitating convergence (i.e. taking fewer epochs and steps for a given accuracy). Training longer also provides more negative examples, improving the results.

Comparison with State-of-the-Art

In this section, example experiments are described in which ResNet-50 is used in 3 different hidden layer widths (width multipliers of 1×, 2×, and 4×). For better convergence, the models here are trained for 1000 epochs.

Linear evaluation. Table 5 compares example results with previous approaches (Zhuang et al., 2019; He et al., 2019a; Misra & van der Maaten, 2019; Hénaff et al., 2019; Kolesnikov et al., 2019; Donahue & Simonyan, 2019; Bachman et al., 2019; Tian et al., 2019) in the linear evaluation setting. FIG. 1 also shows comparisons among different methods. Standard networks are able to be used to obtain substantially better results compared to previous methods that require specifically designed architectures. The best result obtained with the proposed ResNet-50 (4×) can match the supervised pretrained ResNet-50.

TABLE 5

ImageNet accuracies of linear classifiers trained on representations learned with different self-supervised methods.

| Method | Architecture | Param. | Top 1 | Top 5 |
|---|---|---|---|---|
| Methods using ResNet-50: | | | | |
| Local Agg. | ResNet-50 | 24 | 60.2 | — |
| MoCo | ResNet-50 | 24 | 60.6 | — |
| PIRL | ResNet-50 | 24 | 63.6 | — |
| CPC v2 | ResNet-50 | 24 | 63.8 | 85.3 |
| SimCLR (ours) | ResNet-50 | 24 | 69.3 | 89.0 |
| Methods using other architectures: | | | | |
| Rotation | RevNet-50 (4×) | 86 | 55.4 | — |
| BigBiGAN | RevNet-50 (4×) | 86 | 61.3 | 81.9 |
| AMDIM | Custom-ResNet | 626 | 68.1 | — |
| CMC | ResNet-50 (2×) | 188 | 68.4 | 88.2 |
| MoCo | ResNet-50 (4×) | 375 | 68.6 | — |
| CPC v2 | ResNet-161 (*) | 305 | 71.5 | 90.1 |
| SimCLR (ours) | ResNet-50 (2×) | 94 | 74.2 | 92.0 |
| SimCLR (ours) | ResNet-50 (4×) | 375 | 76.5 | 93.2 |

Semi-supervised learning. In some examples, 1% or 10% of the labeled ILSVRC-12 training datasets can be sampled in a class-balanced way (i.e. around 12.8 and 128 images per class respectively). The whole base network can be fine-tuned on the labeled data without regularization. Table 6 shows the comparisons of the results against recent methods (Zhai et al., 2019; Xie et al., 2019; Sohn et al., 2020; Wu et al., 2018; Donahue & Simonyan, 2019; Misra & van der Maaten, 2019; Hénaff et al., 2019). Again, the proposed approach significantly improves over state-of-the-art with both 1% and 10% of the labels.

TABLE 6

ImageNet accuracy of models trained with few labels.

| | | Label fraction | |
|---|---|---|---|
| Method | Architecture | 1% | 10% |
| | | Top 5 | |
| Methods using other label-propagation: | | | |
| Pseudo-label | ResNet50 | 51.6 | 82.4 |
| VAT + Entropy Min. | ResNet50 | 47.0 | 83.4 |
| UDA (w. RandAug) | ResNet50 | — | 88.5 |
| FixMatch (w. RandAug) | ResNet50 | — | 89.1 |
| S4L (Rot + VAT + En. M.) | ResNet50 (4×) | — | 91.2 |
| Methods using representation learning only: | | | |
| InstDisc | ResNet50 | 39.2 | 77.4 |
| BigBiGAN | RevNet-50 (4×) | 55.2 | 78.8 |
| PIRL | ResNet-50 | 57.2 | 83.8 |
| CPC v2 | ResNet-161(*) | 77.9 | 91.2 |
| SimCLR (ours) | ResNet-50 | 75.5 | 87.8 |
| SimCLR (ours) | ResNet-50 (2×) | 83.0 | 91.2 |
| SimCLR (ours) | ResNet-50 (4×) | 85.8 | 92.6 |

Transfer learning. Transfer learning performance was also evaluated across 12 natural image datasets in both linear evaluation (fixed feature extractor) and fine-tuning settings. Hyperparameter tuning was performed for each model-dataset combination and the best hyperparameters on a validation set were selected. Table 8 shows results with the ResNet-50 (4×) model. When fine-tuned, the proposed self-supervised model significantly outperforms the supervised baseline on 5 datasets, whereas the supervised baseline is superior on only 2 (i.e. Pets and Flowers). On the remaining 5 datasets, the models are statistically tied.

TABLE 7

Comparison of transfer learning performance of our self-supervised approach with supervised baselines across 12 natural image classification datasets, for ResNet-50 (4 X) models pretrained on ImageNet. Results not significantly worse than the best (P > 0.05, permutation test) are shown in bold.

| | Food | CIFAR10 | CIFAR100 | Birdsnap | SUN397 | Cars | Aircraft | VOC2007 | DTD | Pets | Caltech-101 | Flowers |
|---|---|---|---|---|---|---|---|---|---|---|---|---|
| Linear evaluation: | | | | | | | | | | | | |
| SimCLR (ours) | 76.9 | 95.3 | 80.2 | 48.4 | 65.9 | 60.0 | 61.2 | 84.2 | 78.9 | 89.2 | 93.9 | 95.0 |
| Supervised | 75.2 | 95.7 | 81.2 | 56.4 | 64.9 | 68.8 | 63.8 | 83.8 | 78.7 | 92.3 | 94.1 | 94.2 |
| Fine-tuned: | | | | | | | | | | | | |
| SimCLR (ours) | 89.4 | 98.6 | 89.0 | 78.2 | 68.1 | 92.1 | 87.0 | 86.6 | 77.8 | 92.1 | 94.1 | 97.6 |
| Supervised | 88.7 | 98.3 | 88.7 | 77.8 | 67.0 | 91.4 | 88.0 | 86.5 | 78.8 | 93.2 | 94.2 | 98.0 |
| Random init | 88.3 | 96.0 | 81.9 | 77.0 | 53.7 | 91.3 | 84.8 | 69.4 | 64.1 | 82.7 | 72.5 | 92.5 |

Example Devices and Systems

Figure 14A:
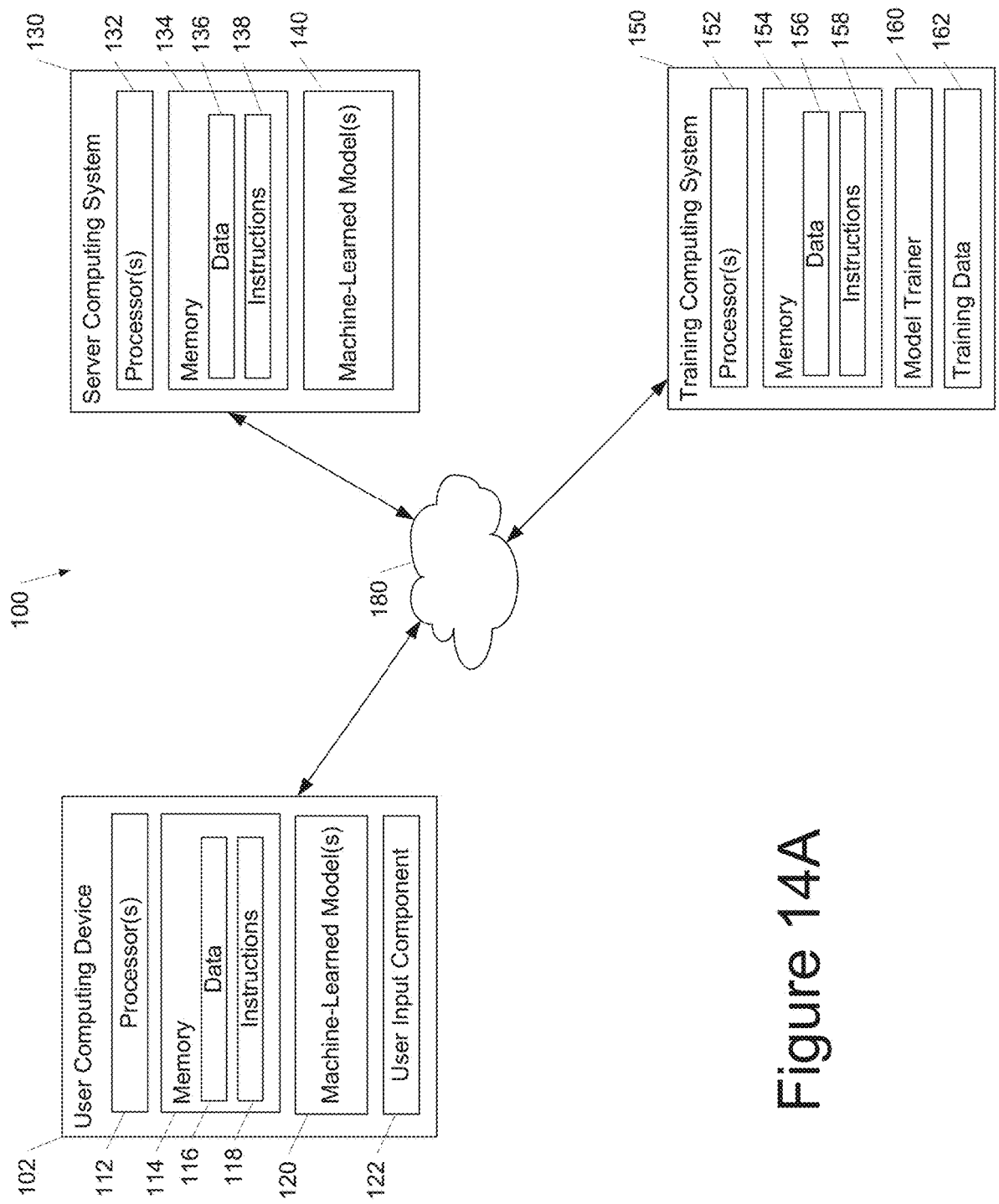
FIG. 14A depicts a block diagram of an example computing system according to example embodiments of the present disclosure.

FIG. 14A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIGS. 2A-B.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a visual analysis service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2A-B.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions such as those contained in FIG. 9. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, data of different modalities such as imagery, audio samples, text, and/or the like. Example types of images that can be used include video frames, LiDAR point clouds, X-ray images, computed tomography scans, hyper-spectral images, and/or various other forms of imagery.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media. The model trainer can be configured to perform any of the contrastive learning techniques described herein.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Figure 11:
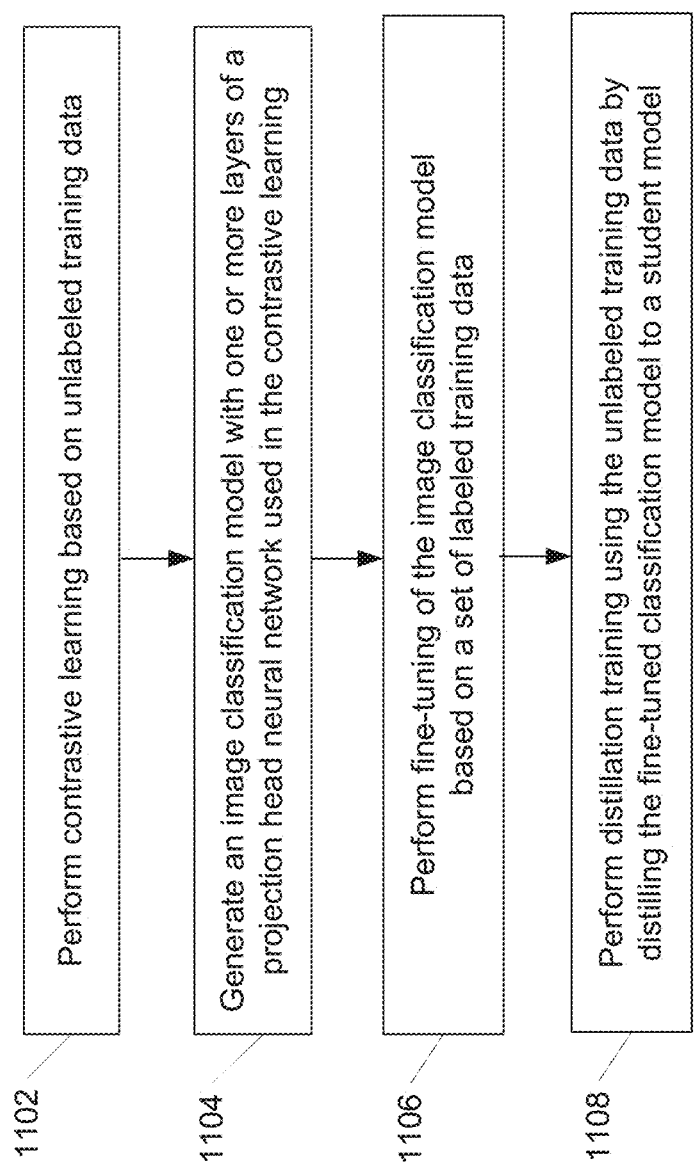
FIG. 11 depicts a flow diagram of an example method for performing semi-supervised contrastive learning of visual representations according to example embodiments of the present disclosure.

FIG. 11 depicts a flow diagram of an example method 1100 for performing semi-supervised contrastive learning of visual representations according to the examples of the present disclosure. Although FIG. 11 depicts steps performed in a particular order for purposes of illustration and discussion, the methods of the present disclosure are not necessarily limited to the particularly illustrated order or arrangement.

The various steps of the method 1100 can be omitted, rearranged, combined, and/or adapted in various ways without deviating from the scope of the present disclosure. Further, the operations and features described with respect to FIG. 11 also may be performed by one or more computing devices of a computing system and/or by one or more processing devices executing computer-readable instructions provided via a non-transitory computer-readable medium.

Method 1100 begins at block 1102 when, for example, a computer system performs contrastive learning based on a set of training data. In an example, the computer system performs contrastive learning based on one or more of the various examples provided in the present disclosure. For example, the computer system may perform contrastive learning based on example framework 200 and other examples provided throughout the present disclosure.

In an example, the computer system performs unsupervised pretraining of a model using contrastive learning based on a set of unlabeled training data. For example, the computer system may pretrain a large, task-agnostic general convolutional network using a large number of unlabeled training data. In various examples, training data generally may include any type of visual and non-visual data including, but not limited to, images, video content, image frames of video content, audio data, textual data, geospatial data, sensor data, etc. Unlabeled training data generally refers to any data where labels, descriptions, features, and/or properties are not provided or otherwise have been deleted, discarded or fully ignored. In an example, pretraining of a model may be performed using unsupervised or self-supervised contrastive learning based on unlabeled, task agnostic training data without class labels and without being directed or tailored to a specific classification task.

In an example, the computer system performs unsupervised pretraining of a large model using a modified version SimCLR. For example, where in some examples, SimCLR training generally may involve ResNet-50 (4×) models, the computer system generally performs unsupervised pretraining of larger models with increased depth and width, such as a 152-layer ResNet with 3× wider channels and selective kernels, a channel-wise attention mechanism that improves parameter efficiency, performance, and accuracy. In some examples, unsupervised pretraining of larger models may include ResNet variants, such as ResNet-D or other variations. Further, pretraining may be performed using a projection head neural network having three or more layers on top of a ResNet encoder or other encoder, such as base encoder neural network 204. In an example, capacity of a projection head neural network, such as projection head neural network 206 may be increased by making it deeper. For example, a projection head neural network may include three or more layers, a portion of which may be later reused during fine-tuning and distillation, instead discarding the projection head neural network entirely after pretraining.

At block 1104, the computing system generates an image classification model with one or more layers of a projection head neural network used in the contrastive learning. In an example, a computer system generates or otherwise configures an image classification model or another type of classification model that has been pretrained based on a set of unlabeled training data. For example, the computer system may generate or configure a pretrained image classification model that has been pretrained in accordance with examples at block 1102 and throughout the present disclosure. In various examples, the computing system generates or configures a classification model for fine-tuning that includes some but not all of multiple projection head neural network layers that have been pretrained using contrastive learning with unlabeled training data, as further described with respect to FIG. 12 and in other examples of the present disclosure.

Figure 12:
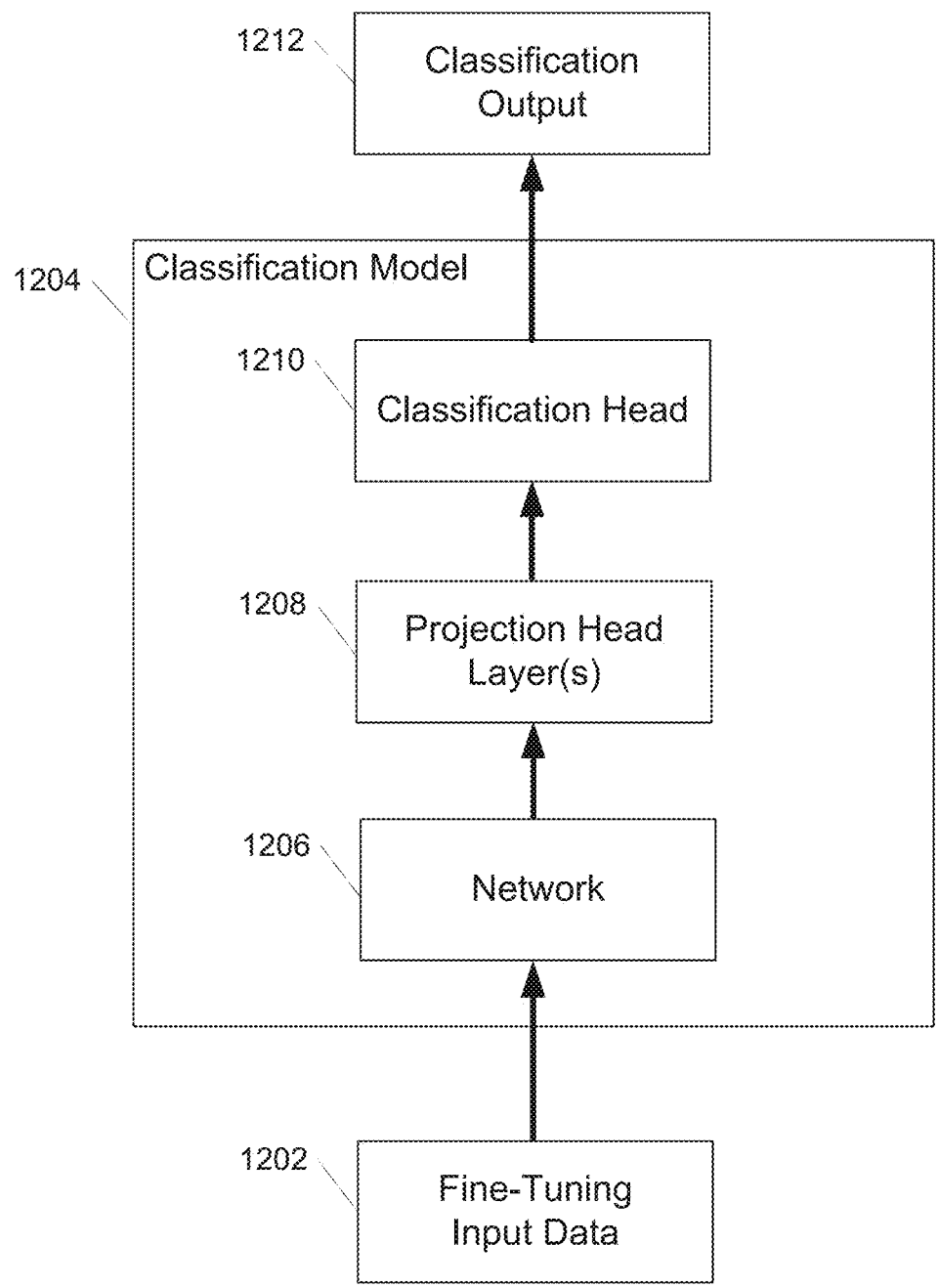
FIG. 12 depicts an example graphical diagram for performing fine-tuning of a classification model with one or more projection head neural network layers that have been pretrained using contrastive learning, according to example embodiments of the present disclosure.

FIG. 12 depicts an example graphical diagram 1200 for performing fine-tuning of a classification model with one or more projection head neural network layers that have been pretrained using contrastive learning, according to example embodiments of the present disclosure. Example graphical diagram 1200 includes fine-tuning input data 1202, classification model 1204, and classification output 1212. In an example, fine-tuning input data 1202, such as labeled training data, is used to fine-tune classification model 1204 during a fine-tuning phase based on classification output 1212. Classification model 1204 further includes network 1206, projection head layer(s) 1208, and classification head 1210.

In an example, classification model 1204 includes a network 1206, such as a task-agnostic network that has been pretrained with contrastive learning using unlabeled training data (e.g., a pretrained base encoder neural network, large convolutional neural network, etc.). Classification model 1204 also reuses a portion of multiple layers of a projection head neural network that also was pretrained with contrastive learning using unlabeled training data (i.e., projection head layer(s) 1208). For example, instead of discarding a projection head neural network (e.g., projection head neural network 206) entirely after pretraining, a portion of the layers of the projection head neural network (i.e., projection head layer(s) 1208) may be retained and incorporated with the pretrained based encoder neural network during fine-tuning. In addition, classification head 1210 generally may receive and process one or more representations to generate classification output 1212, such as a classification prediction, detection prediction, recognition prediction, segmentation prediction, and/or other types of predictions and prediction tasks.

In an example, a three-layer projection head neural network, $g(h_i)=W^{(3)}(\sigma(W^{(2)}\sigma(W^{(1)}h_i)))$ may be used where σ is a ReLU non-linearity (bias not shown), for example, instead of using $f^{task}(x_i)=W^{task}f(x_i)$ to compute the logits of pre-defined classes where $W^{task}$ is the weight for an added task-specific linear layer (bias also not shown). As such, fine-tuning may be performed using a non-input, middle layer of the projection head neural network rather than an input layer based on a new encoder function: $f^{task}(x_i)=W^{task}\sigma(W^{(1)}f(x_i))$.

At block 1106, the computing system performs fine-tuning of the image classification model based on a set of labeled training data. In an example, the computer system fine-tunes a model already pretrained using a set of unlabeled training data. For example, the computer system may perform fine-tuning of a pretrained classification model 1204 based on a set of fine-tuning input data 1202 comprising a relatively small number or proportion of labeled training data (e.g., 1%, 5%, 10%) as compared to a number unlabeled pretraining samples. In various examples, labeled training data generally refers to a set of one or more training data samples that have been associated or tagged with one or more labels, which may include descriptions, features, and/or properties. In some examples, classification model 1204 is fine-tuned with a small fraction of data having class labels, allowing internal representations to be adjusted for one or more specific tasks.

In an example, classification model 1204 obtains or otherwise receives a set of labeled, fine-tuning input data 1202. In various examples, labeled fine-tuning input data 1202 is processed by network 1206 and projection head layer(s) 1208. For example, network 1206 generally may be a task-agnostic, pretrained network that has been pretrained using contrastive learning with unlabeled training data. In addition, a portion of projection head layer(s) 1208 from a projection head neural network that also has been trained using the contrastive learning with the unlabeled training data may be reused instead of being discarded entirely after the pretraining.

For example, some but not all pretrained projection head layer(s) 1208 may be added as one or more respective linear transformation layers on top of a pretrained network (e.g., network 1206), which in some examples may be a pretrained base encoder neural network 204. As such, fine-tuning of classification model 1204 may be performed by adjusting various parameters based on labeled fine-tuning input data 1202, for example, using a supervised cross-entropy loss or other type of loss function (not shown), allowing classification model 1204 to slightly adjust internal representations for one or more specific tasks. In some examples, projection head layer(s) 1208 comprise one or more but not all of a set of pretrained projection head neural network layers. Such projection head layer(s) 1208 may include one or more non-input layers, such as, a non-input first layer or other middle layer, of a pretrained projection head neural network.

At block 1108, the computing system performs distillation training using the unlabeled training data from the contrastive learning, where the fine-tuned classification model is distilled to a comparatively smaller student model. In various examples, the computing system performs distillation training by reusing the unlabeled training data that was previously used during the contrastive learning pretraining. For example, the computing system may reuse the unlabeled pretraining data directly when performing distillation as part of training a lightweight student network specialized for one or more targeted tasks. As such, the unlabeled training data first is used in a task-agnostic fashion for pretraining and then again used in distillation after performing fine-tuning to train a student network for one or more specialized targeted tasks. Examples of distillation training may be described with respect to FIG. 13.

Figure 13:
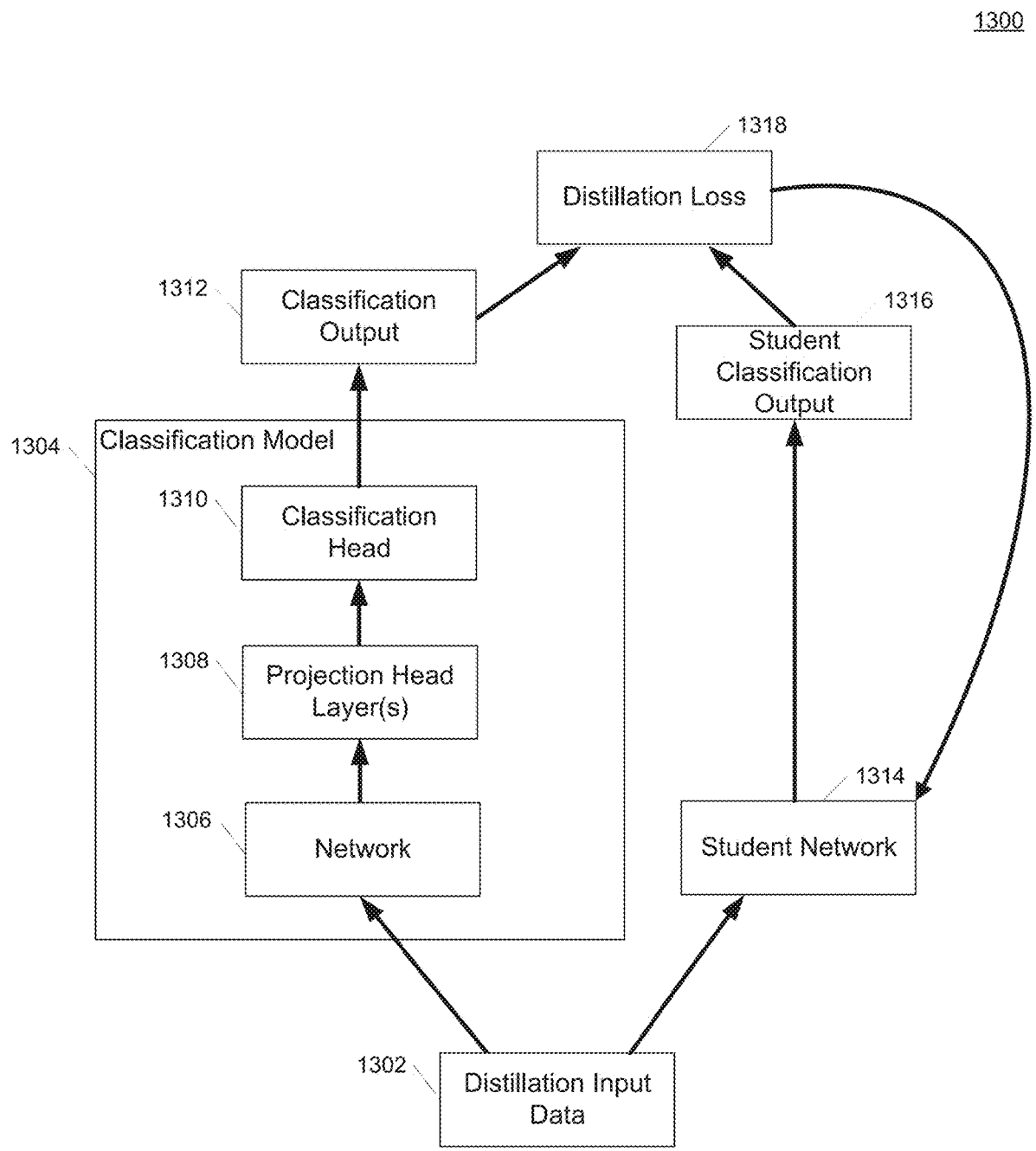
FIG. 13 depicts an example graphical diagram for performing distillation training of a student model based on a fine-tuned classification model with one or more projection head neural network layers that have been pretrained using contrastive learning, according to example embodiments of the present disclosure.

FIG. 13 depicts an example graphical diagram 1300 for performing distillation training of a student model based on a fine-tuned classification model with one or more projection head neural network layers that have been pretrained using contrastive learning, according to example embodiments of the present disclosure. Example graphical diagram 1300 includes distillation input data 1302, classification model 1304, network 1306, projection head layer(s) 1308, classification head 1310, classification output 1312, student network 1314, student classification output 1316, and distillation loss 1318.

In an example, the computing system obtains or otherwise receives distillation input data 1302. Distillation input data 1302 generally may include some or all of the unlabeled data used in pretraining of a model. As such, in various examples, unlabeled distillation input data 1302 was first used when pretraining a model in a task-agnostic fashion and then again reused after performing fine-tuning of the model to distill the fine-tuned model to a student specialized in one or more tasks.

In an example, unlabeled distillation input data 1302 is provided to classification model 1304 and student network 1314 for processing. Classification model 1304 may be an image classification model or any other type of classification model. In various examples, classification model 1304 is a pretrained and fine-tuned classification model. For example, classification model 1304 may be pretrained and fine-tuned according to one or more of the various examples provided in the present disclosure.

In an example, classification model 1304 includes a fine-tuned network 1306, such as a network (e.g., a fine-tuned base encoder neural network, large convolutional neural network, etc.) that was first pretrained with contrastive learning using unlabeled training data and later fine-tuned based on a relatively small set of labeled training data.

Classification model 1304 also includes one or more projection head layer(s) 1308, for example, originally from a projection head neural network pretrained with contrastive learning using unlabeled training data, where the specific projection head layer(s) were preserved after the pretraining and later fine-tuned based on the set of label training data. In various examples, fine tuning of classification model 1304, network 1306, and projection head layer(s) 1308 generally may be performed in accordance with examples discussed at block 1106 and throughout the present disclosure. Further, classification head 1310 may receive and process one or more representations to generate classification output 1312, such as a classification prediction, detection prediction, recognition prediction, segmentation prediction, and/or other types of predictions and prediction tasks.

In an example, classification model 1304 is used to train a student network 1314 that is more specialized for a target task. For example, fine-tuned classification model 1304 is used when performing distillation training to distill the model to student network 1314 comprising a relatively smaller number of parameters relative to image classification model. As such, student network 1314 generally is lightweight and better suited to be deployed to client computing devices with limited local computing resources. For example, student network 1314 may be deployed for use on one or more various different types of client computing devices including, but not limited to, mobile devices, Internet of Things (IOT) edge devices, or any other client devices where data is processed locally instead of being transmitted for remote processing. In various examples, student network 1314 obtains or otherwise receives and processes unlabeled distillation input data 1302 to generate student classification output 1316.

In an example, unlabeled data from a contrastive learning pretraining phase is reused to train student network 1314 for a target task. In some examples, a fine-tuned classification model 1304 provides labels for training student network 1314 and distillation loss 1318 may be minimized based on:

$$\mathcal{L}^{distill} = -\Sigma_i \left[ \sum_y P^T(y|x_i; \tau) \log P^S(y|x_i; \tau) \right]$$

Where $P(y|x_i)=\exp(f^{task}(x_i)[y]/\tau)/\Sigma_{y'} \exp(f^{task}(x_i)[y']/\tau)$, and $\tau$ is a temperature scalar.

In addition, a teacher network (i.e., classification model 1304) that outputs $P^T(y x_i)$ can be fixed during the distillation, so only student network 1314 is trained. In some examples when distillation training involves labeled training data, distillation loss 1318 may be combined with ground-truth labeled examples using a weighted combination as follows.

$$\mathcal{L} = -(1-\alpha) \Sigma_i \left[ \log P^S(y_i|x_i) \right] - \alpha \Sigma_i \left[ \sum_y P^T(y|x_i; \tau) \log P^S(y|x_i; \tau) \right]$$

FIG. 14A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 14B:
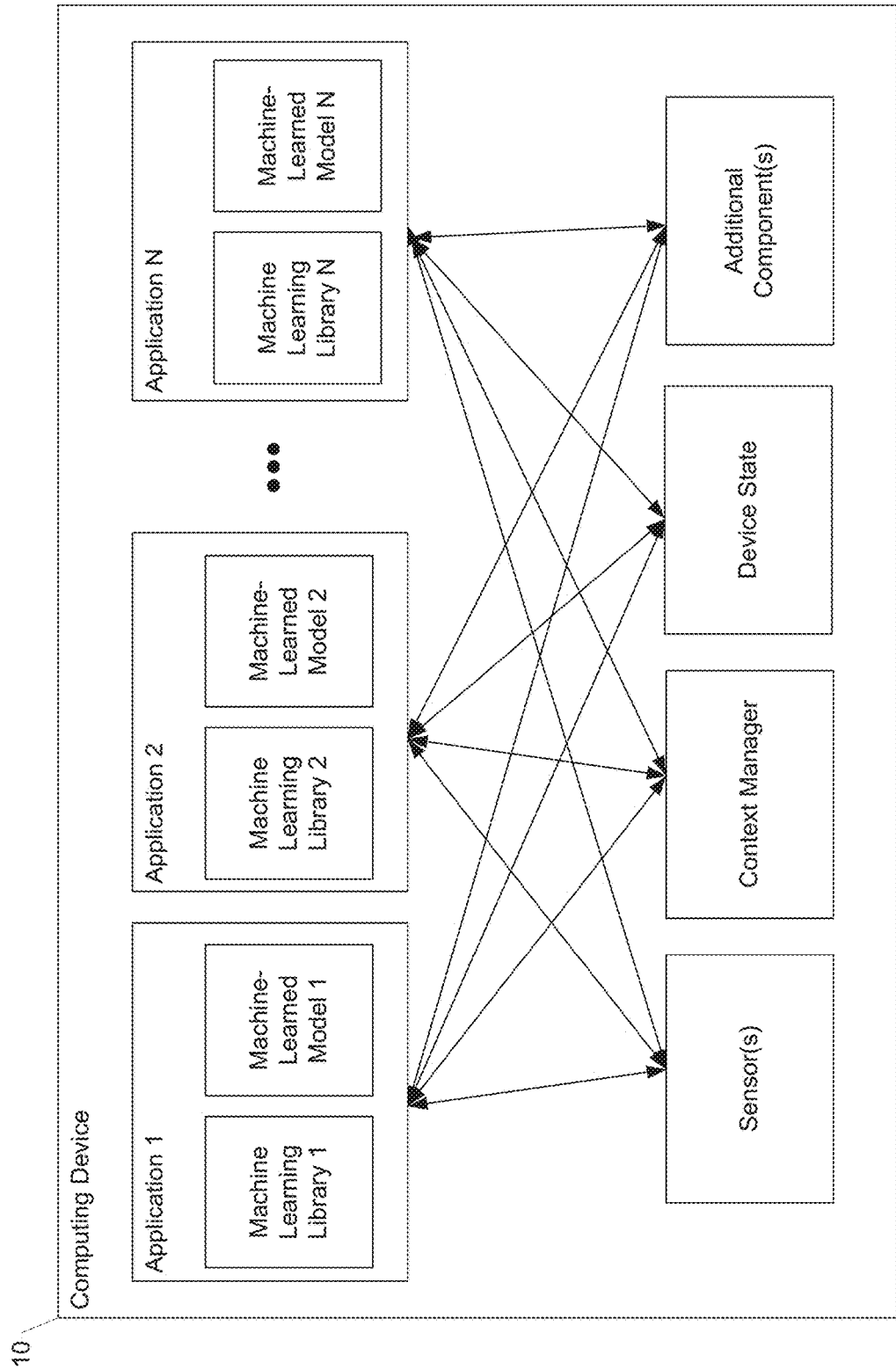
FIG. 14B depicts a block diagram of an example computing device according to example embodiments of the present disclosure.

FIG. 14B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 14B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 14C:
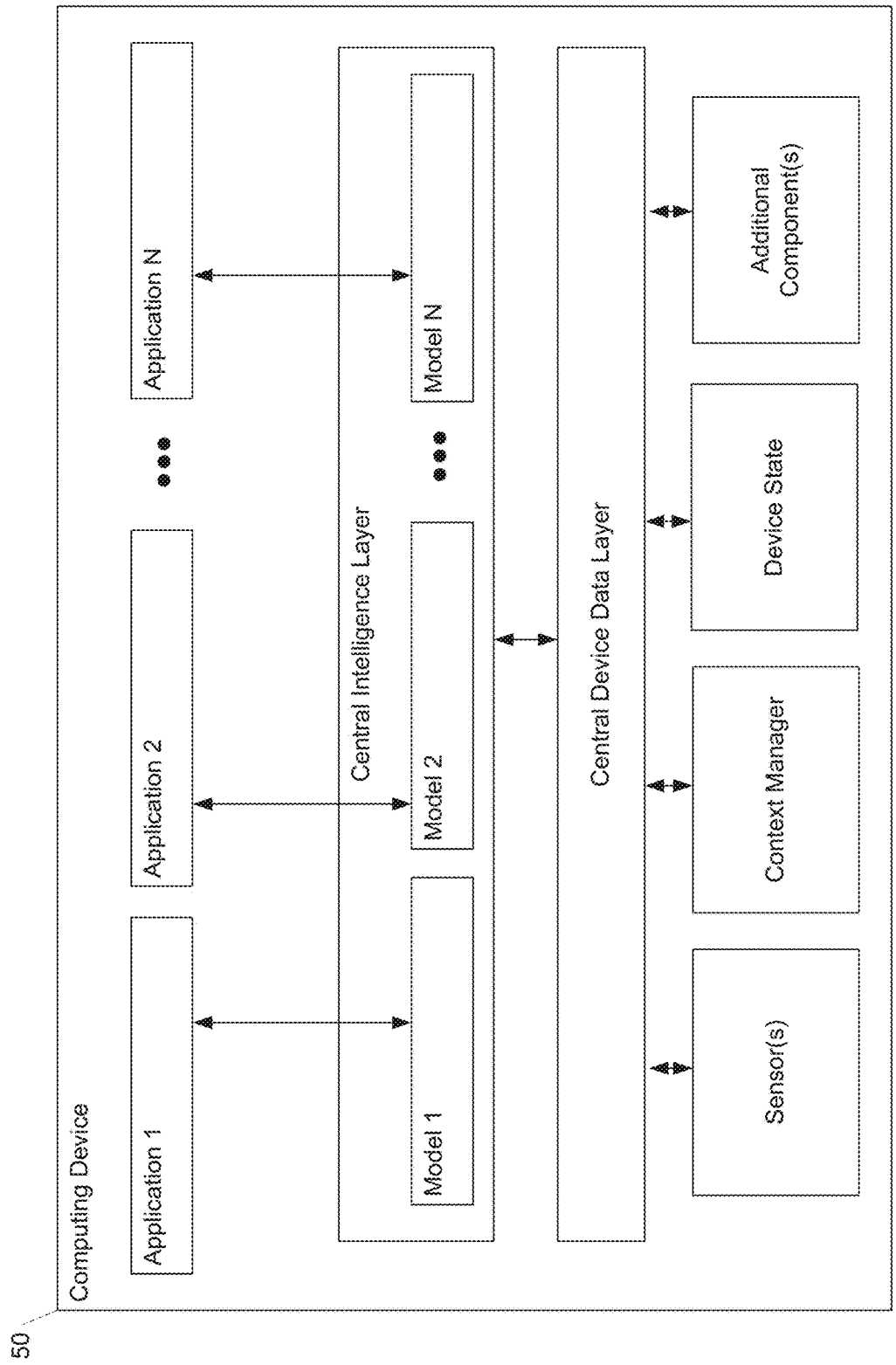
FIG. 14C depicts a block diagram of an example computing device according to example embodiments of the present disclosure.

FIG. 14C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 14C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 14C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein refers to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

EXAMPLE REFERENCES

Abadi, M., Barham, P., Chen, J., Chen, Z., Davis, A., Dean, J., . . . others. (2016). Tensorflow: A system for large-scale machine learning. 12th {USENIX} Symposium on Operating Systems Design and Implementation ({OSDI} 16), (pp. 265-283).

Arora, S., Khandeparkar, H., Khodak, M., Plevrakis, O., & Saunshi, N. (2019). A theoretical analysis of contrastive unsupervised representation learning. arXiv preprint arXiv:1902.09229.

Bachman, P., Hjelm, R. D., & Buchwalter, W. (2019). Learning representations by maximizing mutual information across views. Advances in Neural Information Processing Systems, (pp. 15509-15519).

Becker, S., & Hinton, G. E. (1992). Self-organizing neural network that discovers surfaces in random-dot stereograms. Nature, 355, 161-163.

Berg, T., Liu, J., Lee, S. W., Alexander, M. L., Jacobs, D. W., & Belhumeur, P. N. (2014). Birdsnap: Large-scale fine-grained visual categorization of birds. IEEE Conference on Computer Vision and Pattern Recognition (CVPR), (pp. 2019-2026).

Berthelot, D., Carlini, N., Goodfellow, I., Papernot, N., Oliver, A., & Raffel, C. A. (2019). Mixmatch: A holistic approach to semi-supervised learning. Advances in Neural Information Processing Systems, (pp. 5050-5060).

Bossard, L., Guillaumin, M., & Van Gool, L. (2014). Food-101—mining discriminative components with random forests. European conference on computer vision, (pp. 446-461).

Chen, T., Sun, Y., Shi, Y., & Hong, L. (2017). On sampling strategies for neural network-based collaborative filtering. Proceedings of the 23rd ACM SIGKDD International Conference on Knowledge Discovery and Data Mining, (pp. 767-776).

Cimpoi, M., Maji, S., Kokkinos, I., Mohamed, S., & Vedaldi, A. (2014). Describing textures in the wild. IEEE Conference on Computer Vision and Pattern Recognition (CVPR), (pp. 3606-3613).

Cubuk, E. D., Zoph, B., Mane, D., Vasudevan, V., & Le, Q. V. (2019). Autoaugment: Learning augmentation strategies from data. Proceedings of the IEEE conference on computer vision and pattern recognition, (pp. 113-123).

de Sa, V. R. (1994). Learning classification with unlabeled data. Advances in neural information processing systems, (pp. 112-119).

Devlin, J., Chang, M.-W., Lee, K., & Toutanova, K. (2018). Bert: Pre-training of deep bidirectional transformers for language understanding. arXiv preprint arXiv: 1810.04805.

DeVries, T., & Taylor, G. W. (2017). Improved regularization of convolutional neural networks with cutout. arXiv preprint arXiv:1708.04552.

Doersch, C., Gupta, A., & Efros, A. A. (2015). Unsupervised visual representation learning by context prediction. Proceedings of the IEEE International Conference on Computer Vision, (pp. 1422-1430).

Donahue, J., & Simonyan, K. (2019). Large scale adversarial representation learning. Advances in Neural Information Processing Systems, (pp. 10541-10551).

Donahue, J., Jia, Y., Vinyals, O., Hoffman, J., Zhang, N., Tzeng, E., & Darrell, T. (2014). Decaf: A deep convolutional activation feature for generic visual recognition. International Conference on Machine Learning, (pp. 647-655).

Donahue, J., Krähenbühl, P., & Darrell, T. (2016). Adversarial feature learning. arXiv preprint arXiv:1605.09782.

Dosovitskiy, A., Springenberg, J. T., Riedmiller, M., & Brox, T. (2014). Discriminative unsupervised feature learning with convolutional neural networks. Advances in neural information processing systems, (pp. 766-774).

Everingham, M., Van Gool, L., Williams, C. K., Winn, J., & Zisserman, A. (2010). The Pascal Visual Object Classes (VOC) challenge. International Journal of Computer Vision, 88, 303-338.

Fei-Fei, L., Fergus, R., & Perona, P. (2004). Learning generative visual models from few training examples: An incremental bayesian approach tested on 101 object categories. IEEE Conference on Computer Vision and Pattern Recognition (CVPR) Workshop on Generative-Model Based Vision.

Gidaris, S., Singh, P., & Komodakis, N. (2018). Unsupervised representation learning by predicting image rotations. arXiv preprint arXiv:1803.07728.

Goodfellow, I., Pouget-Abadie, J., Mirza, M., Xu, B., Warde-Farley, D., Ozair, S., . . . Bengio, Y. (2014). Generative adversarial nets. Advances in neural information processing systems, (pp. 2672-2680).

Goyal, P., Dollar, P., Girshick, R., Noordhuis, P., Wesolowski, L., Kyrola, A., . . . He, K. (2017). Accurate, large minibatch sgd: Training imagenet in 1 hour. arXiv preprint arXiv:1706.02677.

Goyal, P., Mahajan, D., Gupta, A., & Misra, I. (2019). Scaling and benchmarking self-supervised visual representation learning. Proceedings of the IEEE International Conference on Computer Vision, (pp. 6391-6400).

Gross, S., & Wilber, M. (2016). Training and investigating Residual Nets. The Torch Blog. http://torch.ch/blog/2016/02/04/resnets.html.

Gutmann, M., & Hyvärinen, A. (2010). Noise-contrastive estimation: A new estimation principle for unnormalized statistical models. Proceedings of the Thirteenth International Conference on Artificial Intelligence and Statistics, (pp. 297-304).

Hadsell, R., Chopra, S., & LeCun, Y. (2006). Dimensionality reduction by learning an invariant mapping. 2006 IEEE Computer Society Conference on Computer Vision and Pattern Recognition (CVPR'06), 2, pp. 1735-1742.

Hamilton, W., Ying, Z., & Leskovec, J. (2017). Inductive representation learning on large graphs. Advances in neural information processing systems, (pp. 1024-1034).

He, K., Fan, H., Wu, Y., Xie, S., & Girshick, R. (2019). Momentum contrast for unsupervised visual representation learning. arXiv preprint arXiv:1911.05722.

He, K., Girshick, R., & Dollar, P. (2019). Rethinking ImageNet pre-training. Proceedings of the IEEE International Conference on Computer Vision, (pp. 4918-4927).

He, K., Zhang, X., Ren, S., & Sun, J. (2016). Deep residual learning for image recognition. Proceedings of the IEEE conference on computer vision and pattern recognition, (pp. 770-778).

Hénaff, O. J., Razavi, A., Doersch, C., Eslami, S. M., & Oord, A. v. (2019). Data-efficient image recognition with contrastive predictive coding. arXiv preprint arXiv:1905.09272.

Hinton, G. E., Osindero, S., & Teh, Y.-W. (2006). A fast learning algorithm for deep belief nets. Neural computation, 18, 1527-1554.

Hjelm, R. D., Fedorov, A., Lavoie-Marchildon, S., Grewal, K., Bachman, P., Trischler, A., & Bengio, Y. (2018). Learning deep representations by mutual information estimation and maximization. arXiv preprint arXiv:1808.06670.

Howard, A. G. (2013). Some improvements on deep convolutional neural network based image classification. arXiv preprint arXiv:1312.5402.

Ioffe, S., & Szegedy, C. (2015). Batch normalization: Accelerating deep network training by reducing internal covariate shift. arXiv preprint arXiv:1502.03167.

Ji, X., Henriques, J. F., & Vedaldi, A. (2019). Invariant information clustering for unsupervised image classification and segmentation. Proceedings of the IEEE International Conference on Computer Vision, (pp. 9865-9874).

Kingma, D. P., & Welling, M. (2013). Auto-encoding variational bayes. arXiv preprint arXiv:1312.6114.

Kolesnikov, A., Beyer, L., Zhai, X., Puigcerver, J., Yung, J., Gelly, S., & Houlsby, N. (2019). Large Scale Learning of General Visual Representations for Transfer. arXiv preprint arXiv:1912.11370.

Kolesnikov, A., Zhai, X., & Beyer, L. (2019). Revisiting self-supervised visual representation learning. Proceedings of the IEEE conference on Computer Vision and Pattern Recognition, (pp. 1920-1929).

Kornblith, S., Shlens, J., & Le, Q. V. (2019). Do better ImageNet models transfer better? Proceedings of the IEEE conference on computer vision and pattern recognition, (pp. 2661-2671).

Krause, J., Deng, J., Stark, M., & Fei-Fei, L. (2013). Collecting a large-scale dataset of fine-grained cars. Second Workshop on Fine-Grained Visual Categorization.

Krizhevsky, A., & Hinton, G. (2009). Learning Multiple Layers of Features from Tiny Images. Tech. rep., University of Toronto. Retrieved from https://www.cs.toronto.edu/kriz/learning-features-2009-TR.pdf Krizhevsky, A., Sutskever, I., & Hinton, G. E. (2012). Imagenet classification with deep convolutional neural networks. Advances in neural information processing systems, (pp. 1097-1105).

Linsker, R. (1988). Self-organization in a perceptual network. Computer, 21, 105-117.

Loshchilov, I., & Hutter, F. (2016). Sgdr: Stochastic gradient descent with warm restarts. arXiv preprint arXiv:1608.03983.

Loshchilov, I., & Hutter, F. (2019). Decoupled Weight Decay Regularization. International Conference on Learning Representations. Retrieved from https://openreview.net/forum?id=Bkg6RiCqY7

Maaten, L. v., & Hinton, G. (2008). Visualizing data using t-SNE. Journal of machine learning research, 9, 2579-2605.

Maji, S., Kannala, J., Rahtu, E., Blaschko, M., & Vedaldi, A. (2013). Fine-Grained Visual Classification of Aircraft. Tech. rep.

Mikolov, T., Chen, K., Corrado, G., & Dean, J. (2013). Efficient estimation of word representations in vector space. arXiv preprint arXiv:1301.3781.

Misra, I., & van der Maaten, L. (2019). Self-supervised learning of pretext-invariant representations. arXiv preprint arXiv:1912.01991.

Nilsback, M.-E., & Zisserman, A. (2008). Automated flower classification over a large number of classes. Computer Vision, Graphics & Image Processing, 2008. ICVGIP'08. Sixth Indian Conference on, (pp. 722-729).

Noroozi, M., & Favaro, P. (2016). Unsupervised learning of visual representations by solving jigsaw puzzles. European Conference on Computer Vision, (pp. 69-84).

Oord, A. v., Li, Y., & Vinyals, O. (2018). Representation learning with contrastive predictive coding. arXiv preprint arXiv:1807.03748.

Parkhi, O. M., Vedaldi, A., Zisserman, A., & Jawahar, C. V. (2012). Cats and dogs. IEEE Conference on Computer Vision and Pattern Recognition (CVPR), (pp. 3498-3505).

Rendle, S., Freudenthaler, C., Gantner, Z., & Schmidt-Thieme, L. (2012). BPR: Bayesian personalized ranking from implicit feedback. arXiv preprint arXiv:1205.2618.

Russakovsky, O., Deng, J., Su, H., Krause, J., Satheesh, S., Ma, S., . . . others. (2015). Imagenet large scale visual recognition challenge. International journal of computer vision, 115, 211-252.

Schroff, F., Kalenichenko, D., & Philbin, J. (2015). Facenet: A unified embedding for face recognition and clustering. Proceedings of the IEEE conference on computer vision and pattern recognition, (pp. 815-823).

Simonyan, K., & Zisserman, A. (2014). Very deep convolutional networks for large-scale image recognition. arXiv preprint arXiv:1409.1556.

Sohn, K. (2016). Improved deep metric learning with multi-class n-pair loss objective. Advances in neural information processing systems, (pp. 1857-1865).

Sohn, K., Berthelot, D., Li, C.-L., Zhang, Z., Carlini, N., Cubuk, E. D., . . . Raffel, C. (2020). FixMatch: Simplifying Semi-Supervised Learning with Consistency and Confidence. arXiv preprint arXiv:2001.07685.

Szegedy, C., Liu, W., Jia, Y., Sermanet, P., Reed, S., Anguelov, D., . . . Rabinovich, A. (2015). Going deeper with convolutions. Proceedings of the IEEE conference on computer vision and pattern recognition, (pp. 1-9).

Tian, Y., Krishnan, D., & Isola, P. (2019). Contrastive multiview coding. arXiv preprint arXiv:1906.05849.

Tschannen, M., Djolonga, J., Rubenstein, P. K., Gelly, S., & Lucic, M. (2019). On mutual information maximization for representation learning. arXiv preprint arXiv:1907.13625.

Wu, Z., Xiong, Y., Yu, S. X., & Lin, D. (2018). Unsupervised feature learning via non-parametric instance discrimination. Proceedings of the IEEE Conference on Computer Vision and Pattern Recognition, (pp. 3733-3742).

Xiao, J., Hays, J., Ehinger, K. A., Oliva, A., & Torralba, A. (2010). SUN database: Large-scale scene recognition from abbey to zoo. IEEE Conference on Computer Vision and Pattern Recognition (CVPR), (pp. 3485-3492).

Xie, Q., Dai, Z., Hovy, E., Luong, M.-T., & Le, Q. V. (2019). Unsupervised data augmentation. arXiv preprint arXiv:1904.12848.

Ye, M., Zhang, X., Yuen, P. C., & Chang, S.-F. (2019). Unsupervised embedding learning via invariant and spreading instance feature. Proceedings of the IEEE Conference on Computer Vision and Pattern Recognition, (pp. 6210-6219).

You, Y., Gitman, I., & Ginsburg, B. (2017). Large batch training of convolutional networks. arXiv preprint arXiv:1708.03888.

Zhai, X., Oliver, A., Kolesnikov, A., & Beyer, L. (2019, 10). S4L: Self-Supervised Semi-Supervised Learning. The IEEE International Conference on Computer Vision (ICCV).

Zhang, R., Isola, P., & Efros, A. A. (2016). Colorful image colorization. European conference on computer vision, (pp. 649-666).

Zhuang, C., Zhai, A. L., & Yamins, D. (2019). Local aggregation for unsupervised learning of visual embeddings. Proceedings of the IEEE International Conference on Computer Vision, (pp. 6002-6012).

Ting Chen, Simon Kornblith, Mohammad Norouzi, and Geoffrey Hinton. A simple framework for contrastive learning of visual representations. *arXiv preprint arXiv:* 2002.05709, 2020.

Geoffrey E Hinton, Simon Osindero, and Yee-Whye Teh. A fast learning algorithm for deep belief nets. Neural computation, 18(7):1527-1554, 2006.

Yoshua Bengio, Pascal Lamblin, Dan Popovici, and Hugo Larochelle. Greedy layer-wise training of deep networks. In Advances in neural information processing systems, pages 153-160, 2007.

Andrew M Dai and Quoc V Le. Semi-supervised sequence learning. In Advances in neural information processing systems, pages 3079-3087, 2015.

Ryan Kiros, Yukun Zhu, Russ R Salakhutdinov, Richard Zemel, Raquel Urtasun, Antonio Torralba, and Sanja Fidler. Skip-thought vectors. In Advances in neural information processing systems, pages 3294-3302, 2015.

Alec Radford, Karthik Narasimhan, Tim Salimans, and Ilya Sutskever. Improving language understanding by generative pre-training. 2018.

Matthew E. Peters, Mark Neumann, Mohit Iyyer, Matt Gardner, Christopher Clark, Kenton Lee, and Luke Zettlemoyer. Deep contextualized word representations. In Proc. of NAACL, 2018.

Jacob Devlin, Ming-Wei Chang, Kenton Lee, and Kristina Toutanova. Bert: Pre-training of deep bidirectional transformers for language understanding. arXiv preprint arXiv:1810.04805, 2018.

Alec Radford, Jeffrey Wu, Rewon Child, David Luan, Dario Amodei, and Ilya Sutskever. Language models are unsupervised multitask learners.

Dong-Hyun Lee. Pseudo-label: The simple and efficient semi-supervised learning method for deep neural networks.

Qizhe Xie, Eduard Hovy, Minh-Thang Luong, and Quoc V Le. Self-training with noisy student improves ImageNet classification. arXiv preprint arXiv:1911.04252, 2019.

Hieu Pham, Qizhe Xie, Zihang Dai, and Quoc V Le. Meta pseudo labels. arXiv preprint arXiv:2003.10580, 2020.

David Berthelot, Nicholas Carlini, Ian Goodfellow, Nicolas Papernot, Avital Oliver, and Colin A. Raffel. Mixmatch: A holistic approach to semi-supervised learning. In Advances in Neural Information Processing Systems, pages 5050-5060, 2019.

Qizhe Xie, Zihang Dai, Eduard Hovy, Minh-Thang Luong, and Quoc V Le. Unsupervised data augmentation. arXiv preprint arXiv:1904.12848, 2019.

Kihyuk Sohn, David Berthelot, Chun-Liang Li, Zizhao Zhang, Nicholas Carlini, Ekin D Cubuk, Alex Kurakin, Han Zhang, and Colin Raffel. Fixmatch: Simplifying semi-supervised learning with consistency and confidence. arXiv preprint arXiv:2001.07685, 2020.

Olivier J Hénaff, Ali Razavi, Carl Doersch, S M Eslami, and Aaron van den Oord. Data-efficient image recognition with contrastive predictive coding. arXiv preprint arXiv:1905.09272, 2019.

Kaiming He, Haoqi Fan, Yuxin Wu, Saining Xie, and Ross Girshick. Momentum contrast for unsupervised visual representation learning. arXiv preprint arXiv:1911.05722, 2019.

Olga Russakovsky, Jia Deng, Hao Su, Jonathan Krause, Sanjeev Satheesh, Sean Ma, Zhiheng Huang, Andrej Karpathy, Aditya Khosla, Michael Bernstein, et al. Imagenet large scale visual recognition challenge. International journal of computer vision, 115(3):211-252, 2015.

Geoffrey Hinton, Oriol Vinyals, and Jeff Dean. Distilling the knowledge in a neural network. arXiv 302 preprint arXiv:1503.02531, 2015.

Cristian Bucilua, Rich Caruana, and Alexandru Niculescu-Mizil. Model compression. In Proceedings of the 12th ACM SIGKDD international conference on Knowledge discovery and data mining, pages 535-541, 3052006.

Kaiming He, Xiangyu Zhang, Shaoqing Ren, and Jian Sun. Deep residual learning for image recognition. In Proceedings of the IEEE conference on computer vision and pattern recognition, pages 770-778, 2016.

Xiang Li, Wenhai Wang, Xiaolin Hu, and Jian Yang. Selective kernel networks. In Proceedings of the IEEE conference on computer vision and pattern recognition, pages 510-519, 2019.

Xinlei Chen, Haoqi Fan, Ross Girshick, and Kaiming He. Improved baselines with momentum contrastive learning. arXiv preprint arXiv:2003.04297, 2020.

Xiaohua Zhai, Avital Oliver, Alexander Kolesnikov, and Lucas Beyer. S4l: Self-supervised semi-supervised learning. In the IEEE International Conference on Computer Vision (ICCV), October 2019.

Yang You, Igor Gitman, and Boris Ginsburg. Large batch training of convolutional networks. arXiv preprint arXiv:1708.03888, 2017.

Sergey Ioffe and Christian Szegedy. Batch normalization: Accelerating deep network training by reducing internal covariate shift. arXiv preprint arXiv:1502.03167, 2015.

Tong He, Zhi Zhang, Hang Zhang, Zhongyue Zhang, Junyuan Xie, and Mu Li. Bag of tricks for image classification with convolutional neural networks. In Proceedings of the IEEE Conference on Computer Vision and Pattern Recognition, pages 558-567, 2019.

Ekin D Cubuk, Barret Zoph, Dandelion Mane, Vijay Vasudevan, and Quoc V Le. Autoaugment: Learning augmentation strategies from data. In Proceedings of the IEEE conference on computer vision and pattern recognition, pages 113-123, 2019.

Christian Szegedy, Vincent Vanhoucke, Sergey Ioffe, Jon Shlens, and Zbigniew Wojna. Rethinking the inception architecture for computer vision. In Proceedings of the IEEE conference on computer vision and pattern recognition, pages 2818-2826, 2016.

Alexey Dosovitskiy, Jost Tobias Springenberg, Martin Riedmiller, and Thomas Brox. Discriminative unsupervised feature learning with convolutional neural networks. In Advances in neural information processing systems, pages 766-774, 2014.

Aaron van den Oord, Yazhe Li, and Oriol Vinyals. Representation learning with contrastive predictive coding. arXiv preprint arXiv:1807.03748, 2018.

Zhirong Wu, Yuanjun Xiong, Stella X Yu, and Dahua Lin. Unsupervised feature learning via non-parametric instance discrimination. In Proceedings of the IEEE Conference on Computer Vision and Pattern Recognition, pages 3733-3742, 2018.

Philip Bachman, R Devon Hjelm, and William Buchwalter. Learning representations by maximizing mutual information across views. In Advances in Neural Information Processing Systems, pages 15509-15519, 337 2019.

Yonglong Tian, Dilip Krishnan, and Phillip Isola. Contrastive multiview coding. arXiv preprint arXiv:1906.05849, 2019.

Diederik P Kingma and Max Welling. Auto-encoding variational bayes. arXiv preprint arXiv:1312.6114, 2013.

Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pages 2672-2680, 2014.

Jeff Donahue and Karen Simonyan. Large scale adversarial representation learning. In Advances in Neural Information Processing Systems, pages 10541-10551, 2019.

Ting Chen, Xiaohua Zhai, Marvin Ritter, Mario Lucic, and Neil Houlsby. Self-supervised GANs via auxiliary rotation loss. In Proceedings of the IEEE Conference on Computer Vision and Pattern Recognition, pages 12154-12163, 2019.

Olivier Chapelle, Bernhard Scholkopf, and Alexander Zien. Semi-supervised learning. MIT Press, 2006.

Xiaojin Zhu and Andrew B Goldberg. Introduction to semi-supervised learning. Synthesis lectures on artificial intelligence and machine learning, 3(1):1-130, 2009.

Avital Oliver, Augustus Odena, Colin A Raffel, Ekin Dogus Cubuk, and Ian Goodfellow. Realistic evaluation of deep semi-supervised learning algorithms. In Advances in Neural Information Processing Systems, pages 3235-3246, 2018.

I Zeki Yalniz, Hervé Jégou, Kan Chen, Manohar Paluri, and Dhruv Mahajan. Billion-scale semi-supervised learning for image classification. arXiv preprint arXiv: 1905.00546, 2019.

Vikas Verma, Alex Lamb, Juho Kannala, Yoshua Bengio, and David Lopez-Paz. Interpolation consistency training for semi-supervised learning. arXiv preprint arXiv: 1903.03825, 2019.

What is claimed is:

1. A computing system to perform contrastive learning of visual representations, the computing system comprising:
one or more processors; and
one or more non-transitory computer-readable media that collectively store:
a base encoder neural network configured to process an input image to generate an intermediate representation of the input image;
a projection head neural network configured to process the intermediate representation of the input image to generate a projected representation of the input image, wherein to generate the projected representation, the projection head neural network is configured to perform at least one non-linear transformation; and
instructions that, when executed by the one or more processors, cause the computing system to perform operations, the operations comprising:
obtaining a training image;
performing one or more first augmentation operations on the training image to obtain a first augmented image, wherein the one or more first augmentation operations comprise one or both of: a first random crop operation that randomly crops the training image and a first random color distortion operation that randomly modifies color values of the training image to the training image;
separate from performing the one or more first augmentation operations, performing one or more second augmentation operations on the training image to obtain a second augmented image, wherein the one or more second augmentation operations comprise one or both of: a second random crop operation that randomly crops the training image and a second random color distortion operation that randomly modifies color values of the training image;
respectively processing, with the base encoder neural network, the first augmented image and the second augmented image to respectively generate a first intermediate representation for the first augmented image and a second intermediate representation for the second augmented image;
respectively processing, with the projection head neural network, the first intermediate representation and the second intermediate representation to respectively obtain a first projected representation for the first augmented image and a second projected representation for the second augmented image;
evaluating a loss function that evaluates a difference between the first projected representation and the second projected representation; and
modifying one or more values of one or more parameters of one or both of the base encoder neural network and the projection head neural network based at least in part on the loss function.

2. The computing system of claim 1, wherein the one or more first augmentation operations further comprises a first resize operation that resizes the training image and wherein the one or more second augmentation operations further comprises a second resize operation that resizes the training image.

3. The computing system of claim 1, wherein the one or more first augmentation operations further comprises a first random flip operation that randomly flips the training image and wherein the one or more second augmentation operations further comprises a second random flip operation that randomly flips the training image.

4. The computing system of claim 1, wherein the first random color distortion operation and the second random color distortion operation have a color distortion strength of at least one half.

5. The computing system of claim 4, wherein the first random color distortion operation and the second color distortion operation have a color distortion strength of one.

6. The computing system of claim 1, wherein the one or more first augmentation operations further comprises a first random Gaussian blur operation that randomly applies a Gaussian blur to the training image and wherein the one or more second augmentation operations further comprises a second random Gaussian blur operation that randomly applies a Gaussian blur to the training image.

7. The computing system of claim 1, wherein the base encoder neural network comprises a ResNet convolutional neural network, and wherein the intermediate representation comprises an output of a final average pooling layer of the ResNet convolutional neural network.

8. The computing system of claim 1, wherein the projection head neural network comprises a multi-layer perceptron that comprises one hidden layer and a rectified linear unit non-linear activation function.

9. The computing system of claim 1, wherein the loss function comprises an L2 normalized cross entropy loss with an adjustable temperature parameter.

10. The computing system of claim 9, wherein the adjustable temperature parameter has a value equal to or greater than 0.1 and equal to or less than 0.5.

11. The computing system of claim 1, wherein the operations further comprise performing the operations described in claim 1 across a training batch of training images, wherein the training batch of training images comprises at least 256 training images.

12. The computing system of claim 11, wherein the training batch comprises greater than 2000 training images.

13. The computing system of claim 12, wherein the training batch comprises greater than 4000 training images.

14. The computing system of claim 11, wherein the operations further comprise performing learning rate scaling based on a number of training images included in the training batch.

15. The computing system of claim 1, wherein the operations further comprise performing the operations described in claim 1 for at least 1000 epochs.

16. The computing system of claim 1, wherein evaluating the loss function comprises evaluating the loss function based only on in-batch negative example sampling, whereby an instance class representation vector is not required to be stored in a memory bank.

17. The computing system of claim 1, wherein evaluating the loss function comprises performing global batch normalization to aggregate mean and variance over a plurality of different devices.

18. A computer-implemented method to perform contrastive learning of visual representations, method comprising:
   obtaining a training image;
   performing one or more first augmentation operations on the training image to obtain a first augmented image, wherein the one or more first augmentation operations comprise one or both of: a first random crop operation that randomly crops the training image and a first random color distortion operation that randomly modifies color values of the training image to the training image;
   separate from performing the one or more first augmentation operations, performing one or more second augmentation operations on the training image to obtain a second augmented image, wherein the one or more second augmentation operations comprise one or both of: a second random crop operation that randomly crops the training image and a second random color distortion operation that randomly modifies color values of the training image;
   respectively processing, with a base encoder neural network, the first augmented image and the second augmented image to respectively generate a first intermediate representation for the first augmented image and a second intermediate representation for the second augmented image;
   respectively processing, with a projection head neural network, the first intermediate representation and the second intermediate representation to respectively generate a first projected representation for the first augmented image and a second projected representation for the second augmented image;
   evaluating a loss function that evaluates a difference between the first projected representation and the second projected representation; and
   modifying one or more values of one or more parameters of one or both of the base encoder neural network and the projection head neural network based at least in part on the loss function.

19. The computer-implemented method of claim 18, wherein the loss function comprises an L2 normalized cross entropy loss with an adjustable temperature parameter.

20. One or more non-transitory computer-readable media that collectively store a base encoder neural network that has been trained by a training method, the training method comprising:
   obtaining a training image;
   performing one or more first augmentation operations on the training image to obtain a first augmented image, wherein the one or more first augmentation operations comprise one or both of: a first random crop operation that randomly crops the training image and a first random color distortion operation that randomly modifies color values of the training image to the training image;
   separate from performing the one or more first augmentation operations, performing one or more second augmentation operations on the training image to obtain a second augmented image, wherein the one or more second augmentation operations comprise one or both of: a second random crop operation that randomly crops the training image and a second random color distortion operation that randomly modifies color values of the training image;
   respectively processing, with the base encoder neural network, the first augmented image and the second augmented image to respectively generate a first intermediate representation for the first augmented image and a second intermediate representation for the second augmented image;
   respectively processing, with a projection head neural network, the first intermediate representation and the second intermediate representation to respectively generate a first projected representation for the first augmented image and a second projected representation for the second augmented image;
   evaluating a loss function that evaluates a difference between the first projected representation and the second projected representation; and
   modifying one or more values of one or more parameters of the base encoder neural network based at least in part on the loss function.

* * * * *